US012759560B2

(12) United States Patent
Boydston et al.

(10) Patent No.: US 12,759,560 B2
(45) Date of Patent: Oct. 13, 2026

(54) GROUND PROFILE ESTIMATION FOR SENSOR DATA

(71) Applicant: Zoox, Inc., Foster City, CA (US)

(72) Inventors: Jacob Daniel Boydston, Bothell, WA (US); Kenneth Nathan Brown, San Carlos, CA (US); Andrew James Feit, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 53 days.

(21) Appl. No.: 18/902,666

(22) Filed: Sep. 30, 2024

(65) Prior Publication Data

US 2025/0018954 A1 Jan. 16, 2025

Related U.S. Application Data

(63) Continuation-in-part of application No. 18/787,998, filed on Jul. 29, 2024, which is a continuation-in-part (Continued)

(51) Int. Cl.

*B60W 40/076* (2012.01)
*G01S 17/89* (2020.01)
*G01S 17/933* (2020.01)

(52) U.S. Cl.

CPC .......... *B60W 40/076* (2013.01); *G01S 17/89* (2013.01); *G01S 17/933* (2013.01)

(58) Field of Classification Search

CPC .... B60W 40/076; G01S 17/89; G01S 17/933; G01S 7/4808; G01S 17/931

See application file for complete search history.

(56) References Cited

U.S. PATENT DOCUMENTS

2021/0096264 A1 4/2021 Bosse et al.
2021/0096566 A1 4/2021 Wang et al.

(Continued)

FOREIGN PATENT DOCUMENTS

JP 2014228300 A 12/2014

OTHER PUBLICATIONS

Non-Final Office Action for related U.S. Appl. No. 18/787,998, dated Nov. 6, 2025, 13 pages.

(Continued)

*Primary Examiner* — Anne Marie Antonucci
*Assistant Examiner* — Luis G Del Valle
(74) *Attorney, Agent, or Firm* — Lee & Hayes, P.C.

(57) ABSTRACT

Techniques for estimating a ground profile, including a ground height (e.g., elevation) and ground roll, for an environment associated with a vehicle are described herein. Sensor data associated with a vehicle may be used to determine sensor data points associated with a path of the vehicle. Based on an upper bound slope and lower bound slope, such as a maximum and/or minimum rate of ground roll change, a region (e.g., search window) may be determined. Based on the region, a subset of sensor data points included in the region may be determined. The subset of sensor data points may be used to determine a representative height and representative roll. In some instances, the representative height and representative roll may be determined using a Hough transform and the subset of sensor data points. A ground profile may be determined based on the representative height and representative roll.

20 Claims, 12 Drawing Sheets

Related U.S. Application Data of application No. 17/710,855, filed on Mar. 31, 2022, now Pat. No. 12,172,649.

(56) References Cited

U.S. PATENT DOCUMENTS

| | | | | |
|---|---|---|---|---|
| 2021/0146998 | A1* | 5/2021 | Niewiadomski ..... | G06V 20/588 |
| 2021/0172756 | A1 | 6/2021 | Wheeler et al. | |
| 2021/0302582 | A1 | 9/2021 | Liu et al. | |
| 2021/0319602 | A1 | 10/2021 | Takahashi et al. | |
| 2022/0379917 | A1 | 12/2022 | Henke et al. | |
| 2023/0136860 | A1* | 5/2023 | Wang .................... | B60W 30/09<br>345/419 |
| 2024/0383482 | A1 | 11/2024 | Boydston | |

OTHER PUBLICATIONS

Office Action for U.S. Appl. No. 17/710,855, Dated Jun. 21, 2024, 22 pages.
Copy of the PCT Search Report and Written Opinion mailed Jul. 19, 2023 for PCT application No. PCT/US23/16965, 11 pgs.
Office Action for U.S. Appl. No. 18/963,161, Dated Feb. 24, 2026, 21 pages.

* cited by examiner

800

DETERMINE, BASED ON THIRD METRIC AND FOURTH METRIC, SECOND REGION, WHEREIN SECOND REGION INCLUDES SECOND SUBSET OF SENSOR DATA POINTS
802

DETERMINE, BASED ON SECOND SUBSET OF SENSOR DATA POINTS, SECOND GROUND POINT, WHEREIN DETERMINING GROUND PROFILE IS FURTHER BASED AT LEAST IN PART ON SECOND GROUND POINT
812

1000

DETERMINE PLURALITY OF FIRST SLOPES ASSOCIATED WITH FIRST SENSOR DATA POINT OF FIRST SUBSET
1002

DETERMINE PLURALITY OF SECOND SLOPES ASSOCIATED WITH SECOND SENSOR DATA POINT OF FIRST SUBSET
1004

WHEREIN DETERMINING REPRESENTATIVE HEIGHT AND REPRESENTATIVE ROLL IS FURTHER BASED ON PLURALITY OF FIRST SLOPES AND PLURALITY OF SECOND SLOPES
1006

GROUND PROFILE ESTIMATION FOR SENSOR DATA

RELATED APPLICATIONS

This application is a continuation-in-part of U.S. application Ser. No. 18/787,998, filed Jul. 19, 2024, which is a continuation-in-part of U.S. application Ser. No. 17/710,855, filed Mar. 31, 2022, the entirety of both of which are incorporated by reference herein.

BACKGROUND

Safety of passengers in a vehicle and other people or objects in proximity to autonomous or semi-autonomous vehicle is of the upmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. Different types of sensors have different weaknesses that may cause a sensor to become unavailable or unreliable (e.g., a camera in dense fog) or for the sensor data to become acutely inaccurate (including detection of multi-path reflections, for example). Such inaccuracy may cause an autonomous vehicle to fail to detect an object. For example, reflections of lidar beams from glass, some metal, and other materials may cause an aberration that may disturb an autonomous vehicle's ability to differentiate between an object and the ground, risking failing to properly detect an object.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
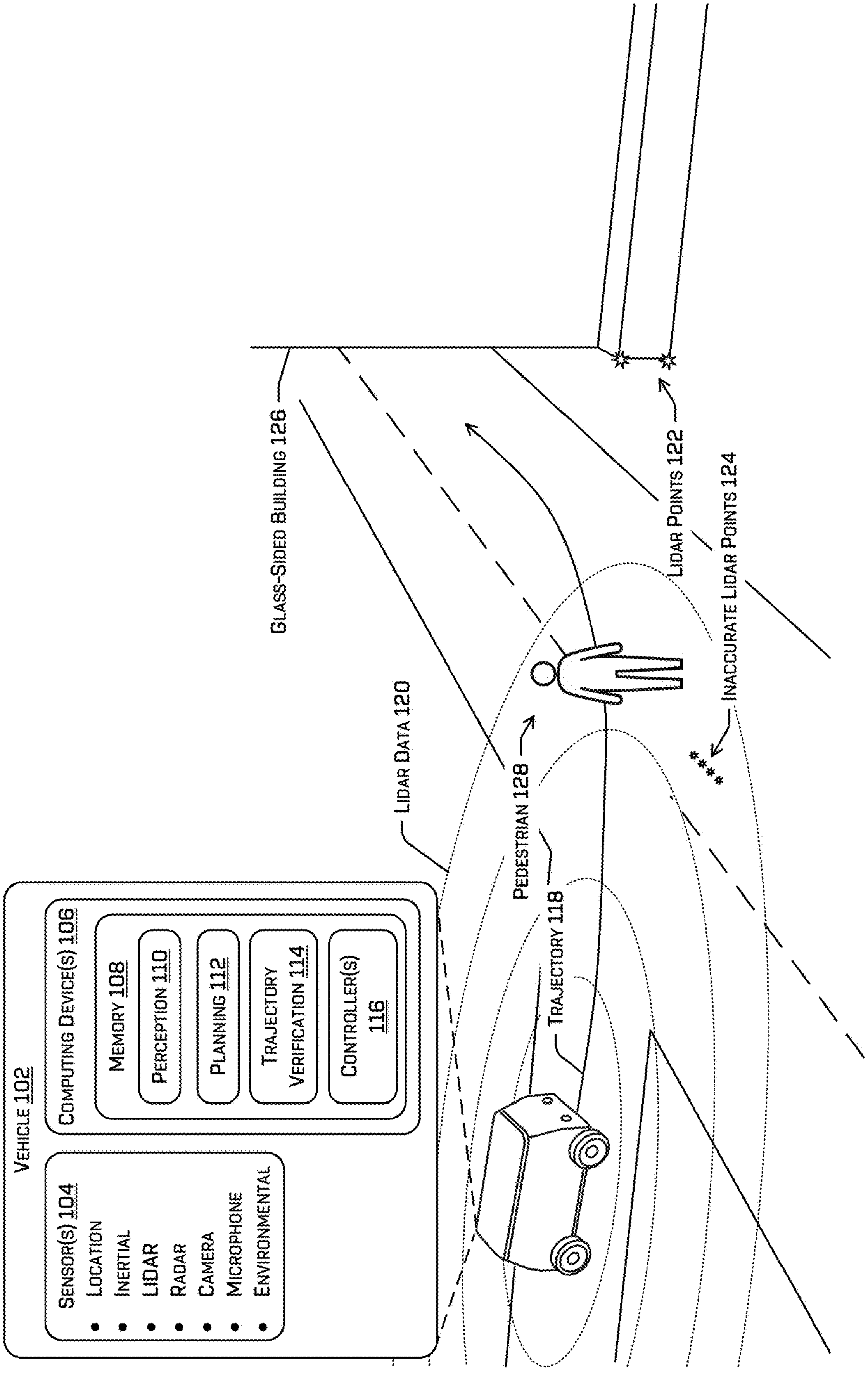
FIG. 1 illustrates an example scenario in which an autonomous vehicle may determine a ground profile to differentiate between sensor data points associated with the ground and sensor data points associated with an object in the presence of inaccurate sensor data points.

As discussed above, various types of materials may reflect sensor emissions differently, and some materials, such as glass or highly reflective metal surfaces, may reflect sensor emissions such that the sensor incorrectly identifies a point associated with the surface as being located in a very different position than the surface. For example, glass reflections of lidar beams may cause a lidar sensor to indicate that there is a return indicating a surface underground (e.g., as may be caused by a multi-path—or multiple reflections—lidar return where the sensor wrongly associated the distance from the device at a particular angle). A perception system may use the sensor data to determine a ground profile that indicates an estimate of where the ground is located. When the sensor data is inaccurate, this ground profile may be incorrect, which may result in the perception system being unable to differentiate between the ground and an object, such as a pedestrian or vehicle and/or otherwise yield unsafe scenarios when relying on such data for navigation. In an instance where the sensor data is inaccurate, an object may be incorrectly identified or failed to be identified and/or an autonomous vehicle may be unable to determine a trajectory for controlling the vehicle.

In some examples, the techniques discussed herein may be executed by a primary perception system and/or a trajectory verification component that validates, rejects, or replaces a trajectory generated to control a vehicle. The trajectory verification system discussed herein may comprise a secondary perception component and/or validation component. Discussions herein of a perception system that executes the operations discussed herein may therefore include the primary perception system or the secondary perception system. For example, the trajectory verification system may receive a trajectory from a planning component and receive, from one or more sensors, sensor data associated with an environment surrounding an autonomous vehicle. In some examples, while a primary perception component may determine perception data based at least in part on all or near all of the sensor data, the secondary perception component of the trajectory verification system may determine a corridor associated with the trajectory and conduct the operations discussed herein based at least in part on a subset of the sensor data associated with the corridor. Of course, the discussion herein is not meant to be so limiting. While use of a corridor may reduce the computational resources required to perform the actions described herein, use of all of the sensor data may be used with plane estimations to obtain better understanding of the scene as a whole. The trajectory verification system may determine the corridor based at least in part on a width and/or length of the vehicle, a current velocity of the vehicle and/or a velocity associated with the trajectory, a distance in front of the vehicle, and/or an offset distance. In at least some examples, such a secondary perception system may further use similar and/or dissimilar hardware and or software with respect to the primary system.

The secondary perception component may comprise an M-estimator, but may lack an object classifier such as, for example, a neural network, decision tree, and/or the like for classifying objects. In additional or alternate examples, the secondary perception system may comprise a machine-learned (ML) model of any type, configured to disambiguate classifications of objects. By contrast, the primary perception component may comprise a pipeline of hardware and/or software components, which may comprise one or more machine-learning models, Bayesian filters (e.g., Kalman filters), graphics processing unit(s) (GPU(s)), and/or the like. In some examples, the perception data may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

In some examples, the secondary perception component may classify the subset of sensor data (associated with the corridor) as belonging to either a ground classification or an object classification. The ground classification may identify sensor data as being associated with a roadway and/or other environmental surface, whereas the object classification may comprise any other object that is not ground. In some examples, the techniques discussed herein may simply classify sensor data as either ground or an object, without further identifying what type of object. The trajectory verification system may use these classifications to determine whether a trajectory is valid by determining whether the trajectory will cause the autonomous vehicle to occupy a position identified by the classification as being associated with an object, as opposed to ground, for example. In some examples, determining that sensor data is associated with the object classification may include determining a ground profile and classifying, as an object, sensor data having an elevation greater than elevation(s) identified by the nearest portion(s) of the ground profile.

In some examples, the techniques may comprise ground estimation techniques that may improve (e.g., decrease) a false negative and/or false positive rate associated with classifying sensor data as ground or as an object. In some examples, the techniques may comprise estimating a line and/or plane to model a profile of a roadway surface (e.g., a roadway height profile), particularly for complex roadways that may comprise one or more changes in grade (e.g., slope of the roadway surface), although the ground profile may additionally or alternatively include flat roadway surfaces. These ground fitting techniques may comprise determining a spline (e.g., one or more polynomials, a Bezier curve, B-spline) associated with the ground based at least in part on determining a number of control points and knots of the spline based at least in part on a number or percentage of sensor data that comprises a valid return. The techniques may additionally or alternatively comprise weighting the sensor data before generating the spline (e.g., by weighting a least-squares regression towards a lowest and/or highest (in elevation) sensor data point), altering a height value (e.g., ordinate) associated with one or more control points based at least in part on sensor data as a post-fitting operation, and/or altering a spacing of the knots as a post-fitting operation. In some examples, determining the spline may comprise determining values of the control points and/or knots based at least in part on a regression algorithm (e.g., least squares). In an example where the line is a spline, the spline may be a B-spline having a number of knots defined by a number of channels associated with the sensor data. See U.S. patent application Ser. No. 16/588,717, filed Sep. 30, 2019, the entirety of which is incorporated by reference herein, for additional details regarding ground profile generation.

Regardless of how the ground profile is generated by the perception system, after a ground profile has been generated, the perception system may correct the ground profile to account for inaccurate sensor data, such as inaccurate sensor data caused by reflections from highly reflective objects, such as chrome bumpers, glass, reflective trailers, etc. The perception system may include hardware (e.g., application-specific integrated circuit (ASIC), field-programmable gate array (FPGA)) and/or software (e.g., such as may be implemented on an FPGA, central processing unit (CPU), graphics processing unit (GPU), microcontroller, or the like) for validating and correcting the ground profile. Validating and/or correcting the ground profile may include determining a slope associated with the ground profile and determining whether there are any locations along the ground profile where the slope meets or exceeds a maximum slope.

The maximum slope may be defined by a global maximum slope (e.g., the steepest road in the world), a regional maximum slope, or a local maximum slope. For example, the maximum slope may be statically set in the case of the global maximum slope at about 40 degrees. In additional or alternate examples, the maximum slope may be determined based at least in part on a location of the vehicle. For example, the vehicle may determine, based at least in part on sensor data (e.g., global positioning system (GPS); lidar, radar, image, and/or the like data used in simultaneous localization and mapping (SLAM) to locate the vehicle), a location of the vehicle and may query a database (e.g., a map) for the slope of the steepest roadway within a specified range of the location (e.g., in the same state as the vehicle, within n miles or feet of the vehicle (where n is a positive integer), in a same city as the vehicle, in a same city region as the vehicle).

If the ground profile doesn't include any portion that has a slope that meets or exceeds the maximum slope, the perception system (which may be the secondary perception system) may identify the ground profile as being validated and may use the ground profile for any of a variety of tasks, such as for use in a secondary perception system that determines whether a trajectory is valid. Additionally or alternatively, this validation may be limited to determining that such slope bounds are met within a specified distance of the vehicle. However, if the perception system determines that a portion of the ground profile is associated with a slope that meets or exceeds the maximum slope, the perception system may execute the following ground profile correction techniques until an end condition is reached. In some examples, the end condition may be a number of iterations of corrections, a distance from the vehicle, a length associated with the trajectory, a number of inliers and/or outliers (to determine whether the ground profile determination is converging/stabilizing), or the like. In some examples, the perception system may search from a position of the vehicle for a closest location that is associated with a slope that meets or exceeds the maximum slope (e.g., as may be computed on a per point basis using any form of finite difference method, for example).

The correction techniques may include determining a line associated with the location at which the slope was determined to meet or exceeds the maximum slope. The line may have a slope that equals the maximum slope and that passes through or originates at the location. In some examples, two lines may be generated—one with a positive slope and one with a negative slope. The positive and negative slopes may have a same absolute magnitude or, in another example, the positive slope may be a maximum positive slope and the negative slope may be a maximum (magnitude) negative slope, i.e., a minimum slope. In some examples, the techniques may include determining preliminary line(s) that pass through or originate from the location and adjusting the line(s) by a vertical offset. Where a single line is determined, if the slope is negative, the line vertical offset may be negative; or, if the slope is positive, the vertical offset may be positive causing the line to be adjusted upwards. Where two lines are determined, a negative vertical offset may be applied to the line having a negative slope, adjusting the negatively sloped line downwards; and a positive vertical offset may be applied to the line having a positive slope, adjusting the positively sloped line upwards.

The perception system may use the line(s) to determine sensor data point(s) to exclude from generating a new ground profile. The first ground profile may have been generated based at least in part on a first subset of sensor data and the new ground profile may be generated based at least in part on a second subset of sensor data. To determine this new subset of sensor data, the perception system may determine a second subset of sensor data points by determining sensor data points that lie below a negatively sloped line and/or sensor data points that lie above a positively sloped line and excluding such sensor data points. These sensor data point(s) that lie above and/or below the line(s) (depending on whether there is one line or two lines) may be excluded from the first subset of sensor data, thereby forming the new subset of sensor data. The new subset of sensor data may be used to generate the new ground profile. In some examples, excluding the first subset of sensor data may include masking or down-weighting the sensor data point(s) that lie above and/or below the line(s). Down-weighting may be used in examples where the ground profile estimation technique includes assigning a weight to sensor data points as part of the line or plane fitting.

The techniques may additionally or alternatively comprise determining a threshold distance based at least in part on a velocity associated with a trajectory generated by a planning component of the autonomous vehicle. For example, the threshold distance may be a stopping distance estimate associated with the vehicle at the current speed of the vehicle and/or at the velocity specified by the trajectory, given the environmental conditions (e.g., gradient, static coefficient of friction associated with roadway and/or roadway condition). A validation component of the trajectory verification system may determine whether any sensor data classified as an object (using the ground profile) is at a distance from the vehicle that is less than the threshold distance or whether a furthest point classified as ground is less than the threshold distance. In either case, the validation component may cause the vehicle to execute an alternate maneuver and/or to re-determine a trajectory based at least in part on determining that an object or the furthest detected ground is within the threshold distance of the vehicle. If the validation component determines that the nearest object is at a distance beyond the threshold distance and the furthest sensor data classified as ground is at a distance beyond the threshold distance, the validation component may validate the trajectory, which may comprise transmitting the trajectory to system controller(s) that may generate signals for actuating drive components of the vehicle to track the trajectory.

Additionally or alternatively, the validation component may determine whether to validate the trajectory or initiate an alternate maneuver based at least in part on a current velocity of the vehicle, a velocity associated with the trajectory, a velocity associated with an object, a current pose of the vehicle, and/or determining whether the sensor data associated with the object and/or ground classification is valid. For example, the techniques may comprise determining whether a current velocity, steering angle, steering rate, and/or heading of the vehicle comports (is within a respective threshold) with a velocity, steering angle, steering rate, and/or heading indicated by the trajectory.

For example, upon validating a trajectory according to the techniques discussed herein, the trajectory verification system may pass or otherwise allow the trajectory to be implemented by the vehicle. However, upon determining that the trajectory is invalid, according to the techniques discussed herein, the trajectory verification system may cause the vehicle to initiate a contingent trajectory (e.g., a safe stop maneuver, an alternate maneuver) and/or re-determine a new trajectory. In some examples, a planning component of the vehicle may determine the trajectory based at least in part on sensor data, map data, localization data (e.g., where the autonomous vehicle is/how the autonomous vehicle is oriented relative to objects in the environment, mapped locations, and/or the like), and/or perception data (e.g., what is in the environment, characteristics of objects in the environment) received from a primary perception component.

The techniques discussed herein may improve the safety of a vehicle by correcting potentially aberrant data that may cause invalid presumptions about the safety of a scenario associated with an autonomous vehicle navigating a trajectory. Moreover, the techniques may reduce the amount of computational bandwidth, memory, and/or power consumed for collision avoidance in comparison to former techniques. The accuracy of the trajectory verification system may also be higher than an accuracy of the primary perception system, thereby reducing an overall error rate of trajectories implemented by the autonomous vehicle by filtering out invalid trajectories. Moreover, the techniques discussed herein may increase the accuracy of either system in the presence of sensor data errors, which may prevent unnecessary braking by the vehicle, aberrant steering, and/or reducing requests transmitted by the vehicle to receive remote assistance, which may reduce network usage by the vehicle and downtime experienced by the vehicle while the vehicle waits for remote assistance.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a trajectory verification component 114, and/or system controller(s) 116. Although depicted in FIG. 1 for illustrative purposes, it is understood that the trajectory verification component 114 may reside in/on a separate computing device (or otherwise) than any one or more of the other components. In some examples, the perception component 110 may be a primary perception component among other perception components, such as a secondary perception component that may be part of trajectory verification component 114. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. In some examples, the trajectory 118 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). The perception component 110 and/or the planning component 112 may include one or more machine-learned (ML) models and/or other computer-executable instructions.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, grade changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be taken into account by the planning component 112 in determining the trajectory 118.

By contrast, the trajectory verification component 114 may monitor a corridor (depicted in FIG. 4) associated with the trajectory 118. For example, the trajectory verification component 114 may receive the trajectory 118 from the planning component 112 and determine the corridor based at least in part on the trajectory. Determining the corridor may comprise determining a region of the environment based at least in part on a current velocity of the vehicle 102, a velocity specified by the trajectory 118, a distance in front of the vehicle, a width of the vehicle, and/or an offset that may be based at least in part on steering rack actuator gains, vehicle kinematics such as tire slippage, body roll, etc., and/or the like. In at least some examples, such a corridor may additionally, or alternatively, represent a simplistic geometric region relative to the vehicle. The trajectory verification component 114 may determine a first subset of the sensor data associated with the corridor and conduct the operations discussed herein based at least in part on the first subset. For example, in the example scenario, the trajectory verification component 114 may determine a first subset that comprises sensor data that includes the portion of the environment indicated by corridor. The trajectory verification component 114 may monitor sensor data associated with the corridor to ensure the trajectory 118 will not or is not likely to result in a collision.

In some examples, the trajectory verification component 114 may conduct the techniques discussed herein that may comprise determining a ground profile associated with the first subset of sensor data associated with the corridor. As discussed further herein, the ground profile may be a line, such as a curve, or a plane that the trajectory verification component 114 fits to the first subset of sensor data. In some examples, the trajectory verification component 114 may reduce a dimensionality of the first subset of sensor data to determine the ground profile, such as in instances where the ground profile is a line. For example, the trajectory verification component 114 may project the first subset of sensor data into a space defined by the trajectory (e.g., a space that references an arc length of the trajectory) without accounting for lateral offset from the trajectory. In other words, the elevations indicated by the first subset of sensor data may be taken into consideration. In an additional or alternate example, the trajectory verification component 114 may determine a plane associated with the first subset of sensor data.

In some examples, the trajectory verification component 114 may determine a slope of the ground profile that meets or exceeds a threshold slope (e.g., by finite difference, numerical derivatives, or analytical derivatives for those curves fit to the data). Such a slope may be caused by inaccurate sensor data. FIG. 1 includes a depiction of such data. For example, the vehicle 102 may receive sensor data that includes lidar data 120. The lidar data may include true positive lidar points 122 and inaccurate lidar points 124 that appear to be underground. In the depicted example, the inaccurate lidar points 124 may be caused by a glass-sided building 126 (which would cause a specular reflection, ultimately wrongly associating the lidar return with the distance to some other object). Although the example discusses lidar data, it is understood that other sensors may similarly encounter situations such as the depicted scenario where the sensor data is inaccurate due to reflections (e.g., radars, ultrasonics, stereo cameras). The inaccurate lidar points 124 may cause the ground profile to be skewed downward (underground in this case, although other cases may cause the ground profile to be skewed upward). In the depicted instance, a pedestrian 128 may be inaccurately classified as a tree or overhead object like a light pole instead of being classified as an object to be avoided, causing a safety-critical problem. The techniques discussed herein rectify the ground profile by determining a second subset of sensor data that excludes the inaccurate lidar points 124 according to the operations discussed herein.

The trajectory verification component 114 may comprise a secondary perception component that may classify the subset of sensor data into one of two classifications: ground or object. In some examples, there may be more classifications (e.g., different object classifications). The trajectory verification component 114 may additionally or alternatively comprise a validation component that may determine the threshold distance discussed herein and/or determine whether to validate or reject the trajectory 118. Validating the trajectory 118 may comprise transmitting the trajectory 118 to the controller(s) 116 (e.g., the validation component may comprise a multiplexer, one or more transistors configured as a switch that passes the trajectory 118 upon receiving a signal from the validation component, a publish-subscribe network where the validation component transmits the and/or the like that may provide a signal that allows the trajectory 118 signal to pass to the controller(s) 116). Rejecting the trajectory 118 may comprise transmitting a message to the planning component 112 to initiate re-determining a trajectory and/or initiating an alternate maneuver, such as a safe stop maneuver (e.g., emergency braking, pull over and park) and/or a contingent trajectory that may be received from the planning component 112 in addition to the trajectory 118 and/or stored in the memory 108. In some examples, the trajectory verification component 114 may determine that at least a portion of the subset of the sensor data is valid or invalid based at least in part on an orientation of the sensors and/or a topology of the environment and/or a lower and upper bound of a valid portion of the sensor data, as discussed in more detail herein.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

Figure 2:
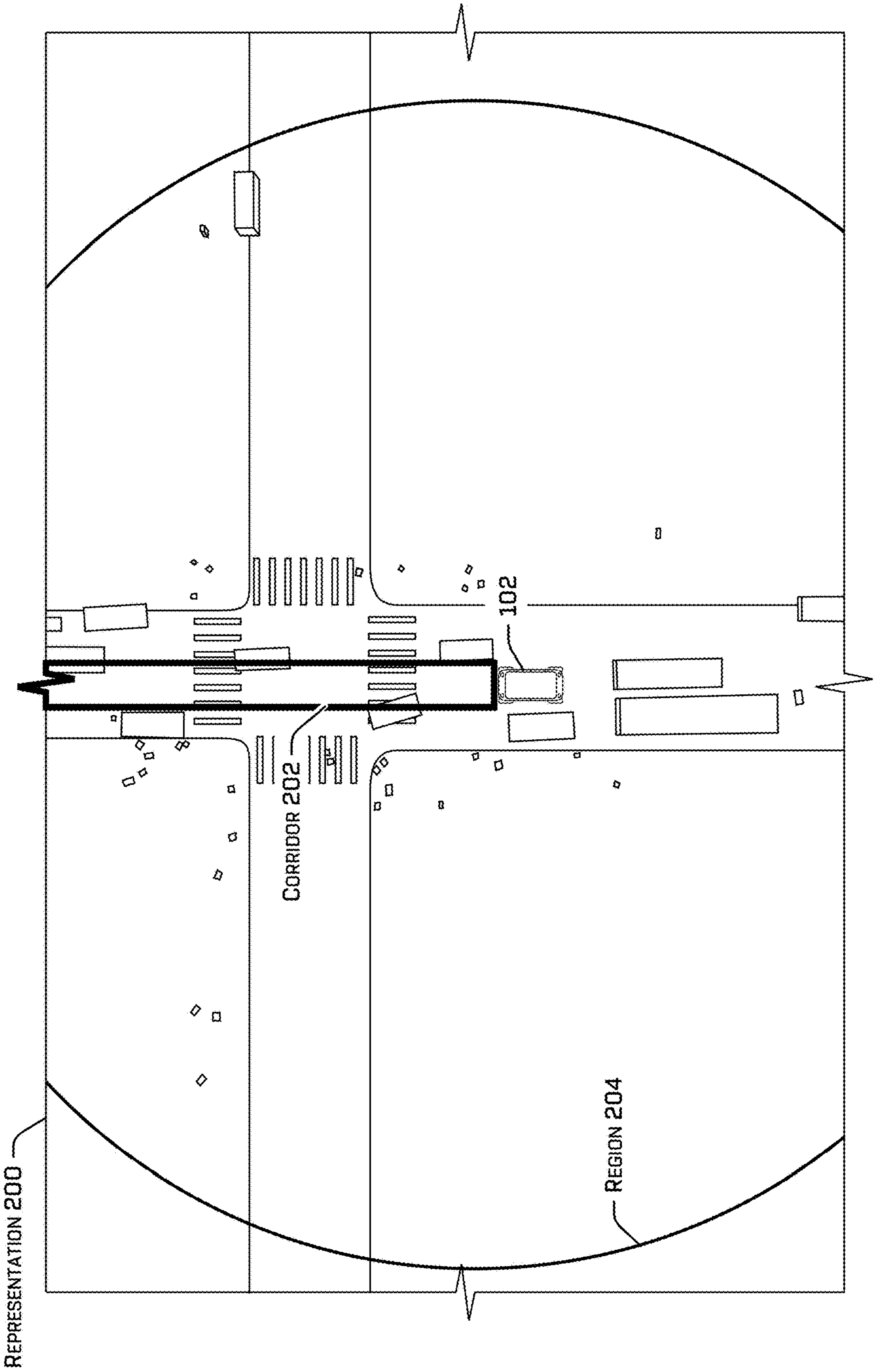
FIG. 2 illustrates a top-down view of an example scenario and a corridor monitored by the trajectory verification component compared to an additional or alternative trajectory verification system monitoring region.

FIG. 2 illustrates a top-down view of a sensor data representation 200 of an example scenario and the corridor 202 monitored by the trajectory verification component compared to an additional or alternative trajectory verification system monitoring region 204. Sensor data within region 204, represented as a circle, may be monitored by an additional or alternative trajectory verification system. In an additional or alternate example, region 204 may identify a distance from the vehicle 102 monitored by the (primary) perception component 110. In such an example, the region 204 may correspond to a maximal effective range of one or more of the sensor(s) 104.

Note that, in the depicted example, the trajectory is straight; therefore, the corridor 202 is correspondingly straight. It is noted that the corridor 202 shape may be based at least in part on a shape of the trajectory 118 and may be curved, not uniform, and/or not straight, in accordance with the trajectory 118 and/or a topology of the environment. In some examples, the corridor 202 may be two or three or more-dimensional.

Figure 3:
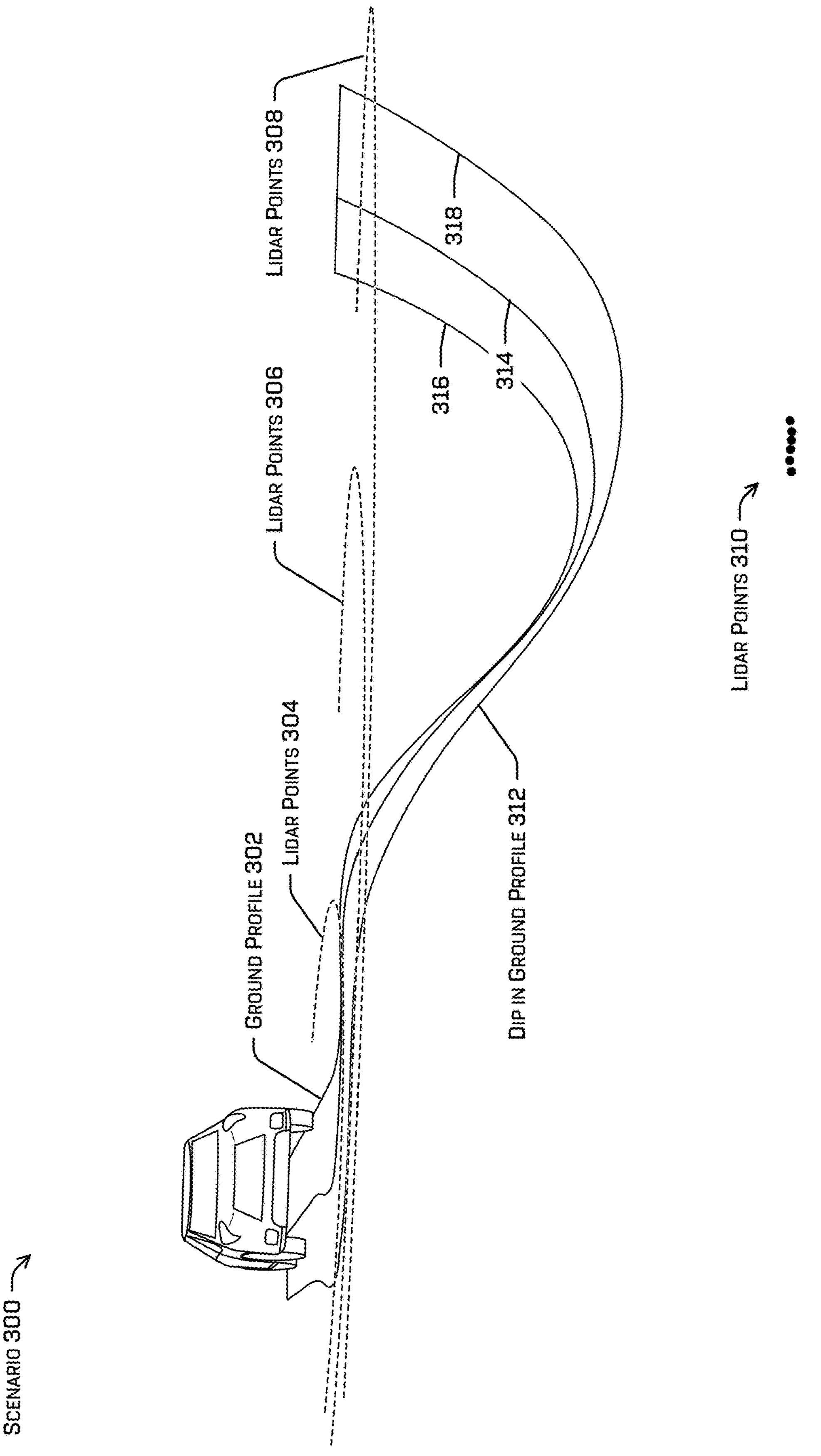
FIG. 3 illustrates example sensor data that includes inaccurate sensor data and a resultant inaccurate ground profile.

FIG. 3 illustrates example lidar data that includes inaccurate lidar data and a resultant inaccurate ground profile for a scenario 300 that may correspond with example scenario 100. A perception component of the vehicle 102 may determine the inaccurate ground profile, i.e., ground profile 302, based at least in part on lidar data that includes lidar points 304, 306, 308, and 310. Lidar points 310 may be inaccurate and may be caused by a reflection, in at least one example. The inaccurate lidar points 310 may skew the ground profile 302, resulting in a dip in the ground profile 312, which inaccurately represents where the drivable surface is located and which may result in incorrectly classifying objects at or near the dip in the ground profile 312. Note that ground profile 302 may be the line 314 in the middle of the plane in which case the outer lines 316 and 318 may be a depiction of the lateral extents of a corridor. Additionally or alternatively, the ground profile 302 may be the plane itself and line 314 may be a depiction of a superimposition of the trajectory 118 onto the ground profile 302.

Example Process

Figure 4:
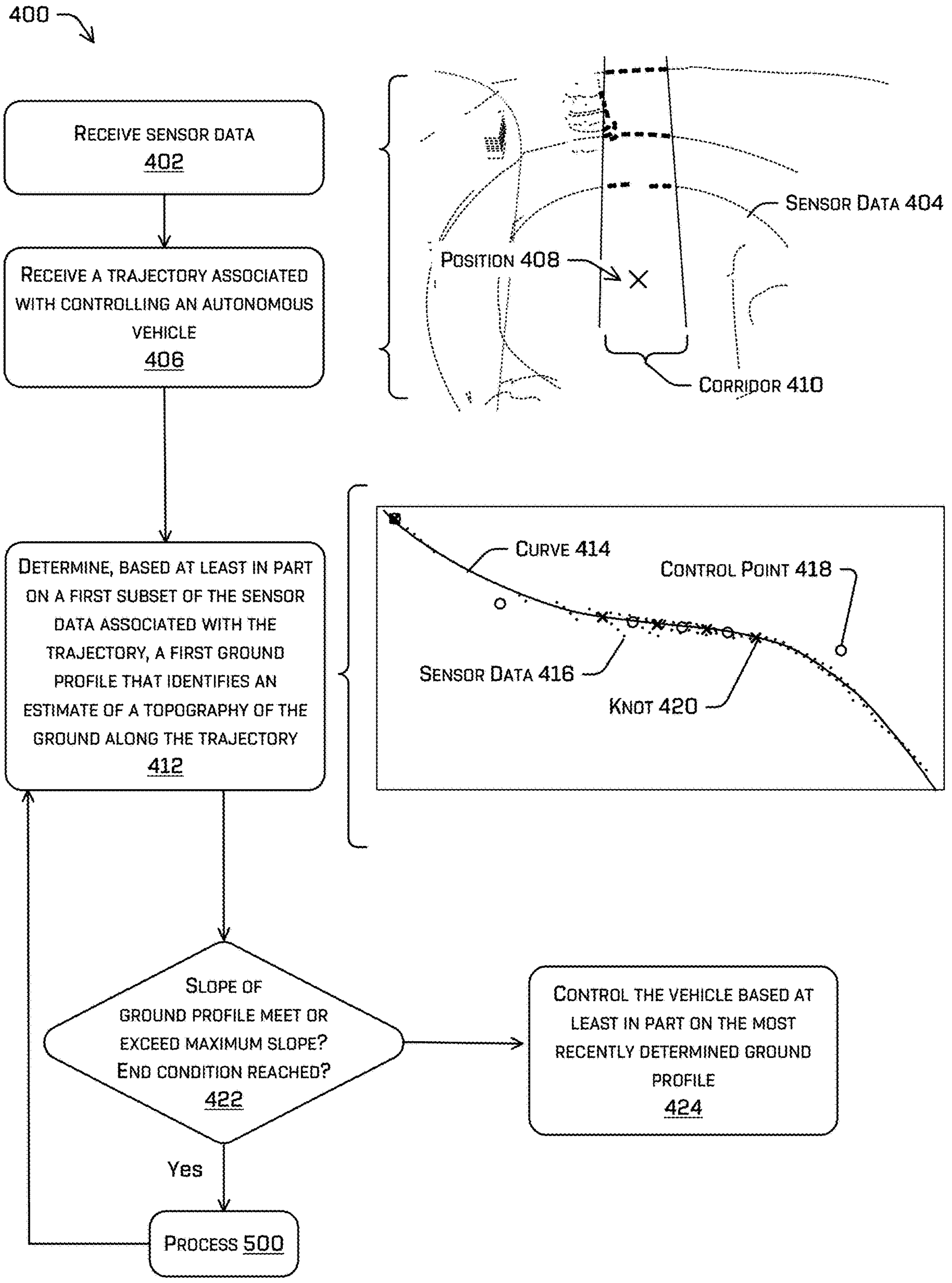
FIG. 4 illustrates a pictorial flow diagram of an example process for correcting an inaccurate ground profile.

FIG. 4 illustrates a pictorial flow diagram of an example process 400 for determining a ground profile based at least in part on sensor data received at a vehicle. The example process 400 further includes validating and/or correcting the ground profile. The vehicle does not need prior knowledge that there is inaccurate sensor data present or that the ground profile is skewed to correct a ground profile. In some examples, example process 400 may be conducted iteratively, as discussed further herein. In some examples, example process 400 may be conducted by a primary perception system of the vehicle. In an additional or alternate example, example process 400 may be executed by a secondary perception system of the vehicle, such as a perception component of a trajectory verification component or other systems that rely on a high accuracy ground profile.

At operation 402, example process 400 may comprise receiving sensor data from a sensor associated with the autonomous vehicle, according to any of the techniques discussed herein. For example, the sensor data 404 may comprise LIDAR and/or radar data, among other types of sensor data. The techniques may be used for a variety of sensor data types and may not be limited to light-based sensors. In some examples, the sensor data may comprise depth data (e.g., data indicating a distance from the sensor/autonomous vehicle to a surface in the environment), Doppler data associated with detected surfaces, and/or any other type of sensor data that indicates the position of objects in the environment surrounding the autonomous vehicle.

At operation 406, example process 400 may comprise receiving a trajectory from a planning component of the vehicle. For example, the trajectory may be a trajectory that will be implemented by the vehicle unless it is rejected by a trajectory verification component of the vehicle. In some examples, at operation 406, the trajectory may be simplified to a set of waypoints, i.e., discrete locations, through which the vehicle is to travel. The discussion herein may use one or more waypoints (locations within an environment) instead of or in addition to a path or trajectory, as discussed herein, although a trajectory is referenced for simplicity. The disclosure is not intended to limit the disclosure to a trajectory alone, but may use waypoint(s) and/or path in addition or alternatively. In some examples, determining the waypoints based at least in part on the trajectory may include determining the waypoints based at least in part on a set of controls associated with the trajectory for controlling motion of the vehicle. In yet another example, the set of waypoint(s) may be received from a first system without needing to determine the waypoint(s) from a trajectory or set of trajectories.

For example, the trajectory may identify a rate of steering, acceleration, and/or the like for controlling motion of the vehicle. The trajectory is unillustrated to increase clarity of the diagram. In some examples, the trajectory may comprise a current and/or planned position and/or velocity of the autonomous vehicle. In some examples, the perception system (whether it's the primary or a secondary perception system) may additionally or alternatively receive a current pose (i.e., position and/or orientation) of the vehicle, such as position 408. For example, the current pose may be received from a localization component and the trajectory may be received from a planning component and/or one or more sensors of the autonomous vehicle (e.g., wheel encoders, GPS). Of course, in other examples, 2- or 3-dimensional waypoints, lines, curves, polygons, surfaces, or otherwise may be used to represent the path (or portion thereof) the vehicle plans to travel.

In an additional or alternate example, the vehicle may additionally or alternatively receive a path that the vehicle has planned to travel from an origination point to a termination point. For example, the path may define a lane or portion of a roadway that the vehicle plans to occupy from the origination point to the termination point. The origination point may be an original point from which the vehicle started travelling or a current position and/or pose of the vehicle and the termination point may be an intermediate point on a route (e.g., an end of a block; a set number of meters; a location associated with a next operation, such as executing a turn, or merging onto a highway) or a final destination for the route. The route may be define the overarching plan to accomplish a mission, such as the sequence of maneuvers and roadways the vehicle is to complete to navigate from a starting position to a final destination.

In examples where the ground profile is limited to a region associated with the trajectory, the perception system may determine a corridor 410 associated with the trajectory (and/or waypoints and/or path). In some examples, determining the corridor may be based at least in part on the trajectory, a width and/or length of the autonomous vehicle, a distance in the direction of travel of the vehicle, a current velocity, and/or an offset. In at least some examples, such corridor dimensions may be based on, for example, parameters associated with the vehicle. As a non-limiting example, the length of the corridor may be a function of the velocity of the vehicle, whereas the width, as another example, may be based on a turning radius of the vehicle, likely speeds associated with objects in the vicinity of the vehicle, and the like.

At operation 412, example process 400 may comprise determining a first subset of the sensor data associated with the corridor (in examples where the ground profile is determined in a limited region) and determining, based at least in part on the first subset, a first ground profile that identifies an estimate of a topography of the ground along the trajectory, according to any of the techniques discussed herein. FIG. 4 depicts corridor 410, sensor data outside the corridor 410 as gray, and the first subset of sensor data within the corridor 410 as black. It is understood that the operations discussed herein may be applied to all of the sensor data or a different subset of sensor data, such as a subset of sensor data associated with a target region that the vehicle is planning to move into.

In an example where example process 400 is applied iteratively, the ground profile determined at operation 412 may be an n-th ground profile associated with an n-th iteration of the example process 400. In such an example, the subset of sensor data used to generate the n-th ground profile may be an n-th subset of sensor data. The first subset of sensor data associated with the first iteration may be an initial subset of sensor data determined based at least in part on the corridor 410, whereas the second and following subsets of sensor data may be the subset of sensor data associated with the corridor with some sensor data removed according to example process 500 described with reference to FIG. 5.

For the sake of simplicity, the following discussion regarding determining a ground profile assumes that the ground profile has been chosen to be a curve (e.g., instead of a plane or a series of linear lines). It is understood that the discussion herein may be extended to planes, etc. Determining the ground profile may include determining a curve 414 based at least in part on the subset of sensor data, illustrated as dots, such as sensor data 416. The curve or plane may include a polynomial and/or spline, such as a Bezier curve, B-spline, non-uniform rational B-spline (NURBS), and/or the like. In an example where the ground profile is determined by determining a spline, the vehicle may determine knots and control points to fit the curve to the sensor data 416. For example, FIG. 4 depicts control points as "o" marks, such as control point 418, and knots as "x" marks, such as knot 420.

A knot may define a terminus of a span of the curve. The span of the curve may be defined by a polynomial (or other curve function), the parameters of which may be defined by one or more control points. In some examples, the number of control points may be determined to be less than a number of channels of a sensor that include valid sensor data and the number of knots may be determined based at least in part on the number of control points and a curve degree (e.g., which may be set to equal the number of control points or, in additional or alternate examples, may be three or more). In some examples, the number of knots may equal the number of control points plus the curve degree plus one.

Operation 412 may additionally or alternatively comprise a fitting algorithm that minimizes a total residual associated with differences (errors) between individual sensor data points and the curve 414. The fitting algorithm may determine values of the control point vector and/or knot vector, which may define locations of control point(s) and/or knot(s). The control points and knots may define a spline or other curve. In some examples, the fitting algorithm may comprise a least-squares regression to fit an estimated curve, defined by the control points and knots, to the sensor data. In some examples, the fitting algorithm may be a weighted algorithm, such as weighted least squares (e.g., using the weights determined in association with the sensor data based at least in part on the elevations defined by the sensor data), although any other suitable fitting algorithm may be used, such as any of a variety of nonlinear least squares algorithms, such as the Gauss-Newton algorithm, and/or the like. Additional details are discussed in U.S. patent application Ser. No. 16/588,717, filed Sep. 30, 2019, the entirety of which is incorporated by reference herein. In some examples, a weight associated with a sensor data point may be determined based at least in part on an elevation indicated by the sensor data point. The lower the elevation indicated the sensor data point, the more likely the sensor data point may be associated with ground and therefore may have a greater weight associated therewith.

Functionally, the fitting of the curve at operation 412 may comprise altering the curve, control points, and/or knots based at least in part on the portion of sensor data and/or a ruleset, according to any of the techniques discussed herein. The ruleset may be generated based at least in part on the portion of the sensor data and may specify maximum elevation values of the control points based at least in part on elevation values of the sensor data (e.g., a control point may not have an elevation that exceeds a maximum elevation value of the sensor data) and/or a knot spacing technique. For example, the knot spacing technique may comprise determining a spacing (e.g., a distance) between knots and altering the spacing therebetween so that the knots are evenly spaced over an arc length or other distance. Some fitting algorithms may space the knots based at least in part on an index numbers of the sensor data (e.g., such that the knots are evenly distributed across the index numbers), but this may cause some knots to be overly distant or close to each other spatially.

Note that, at least for the depicted example, the curve 414 was generated for three-dimensional sensor data projected into a two-dimensional coordinate frame, representing elevation on a vertical axis and points along a longitudinal component of the trajectory along the horizontal axis. The curve may be determined in the two-dimensional space and projected back into the three-dimensional space associated with the original sensor data in order to determine whether sensor data is associated with a ground classification (e.g., sensor data that has an elevation less than or equal to the curve) or an object classification (e.g., sensor data that has an elevation above the curve). Such a determination may comprise translating the curve across the corridor to iteratively determine whether sensor data associated with a portion of the corridor is ground or an object. Additionally or alternatively, a plane may be fit to three-dimensional data instead of or in addition to a curve being fit to two-dimensional sensor data.

In some examples, determining the ground profile may include determining an initial segment of the ground profile. Initialization of the ground profile may increase the accuracy of the resultant ground profile. The initial segment may include a first portion of the ground profile, from which the remaining portion of the ground segment may be determined. This initial segment may be included in the fitting discussed above, even though it may not necessarily include sensor data. The initial segment may be weighted more heavily than sensor data, in some examples, although in additional or alternate examples, the initial segment may be given equal weight. Determining the initial segment may include determining a previous path or trajectory associated with previous operation of the autonomous vehicle (e.g., the previously implemented trajectory may be used as the initial segment), determining a position and orientation of one or more axles of the autonomous vehicle and determining a plane associated therewith that may be used to determine the initial segment, and/or determining a nearest location to the autonomous vehicle along the ground profile in a direction defined by the trajectory that is associated with a slope that is less than or equal to a maximum slope.

At operation 422, example process 400 may comprise determining whether a slope at a point on the ground profile meets or exceeds a maximum slope, according to any of the techniques discussed herein. Operation 422 may be conducted for an absolute value of the slope i.e., an absolute value of a negative slope or an absolute value of a positive slope may exceed maximum slope or a positive maximum slope. In some examples, operation 422 may comprise determining slopes at points along the ground profile starting from a point on the ground profile closest to the vehicle and continuing to determine slopes along the ground profile until a slope is determined that meets or exceeds the maximum slope or a maximum arc length or distance along the trajectory is reached. Determining a slope may include determining a derivative associated with the ground profile at a point along the ground profile associated with a point on the trajectory. In some examples, this slope may have already been determined as part of determining a spline, such according to determining a NURBS.

In some examples, the maximum slope may be a static number stored in memory associated with a global maximum slope of a roadway (e.g., the slope of the steepest roadway in the world, 37.45 degrees, 40 degrees), a regional maximum slope of a roadway (e.g., a steepest slope in the country, county, or city in which the vehicle is operating), etc. In an additional or alternate example, the vehicle may determine, using sensor data, a location of the vehicle and may transmit a request to a server for the slope of the steepest nearest to the vehicle location within a set distance of the vehicle. The server may provide this slope and this slope may be used as the maximum slope. In some examples, the maximum slope may comprise a negative maximum slope and a positive maximum slope that may be different than each other, such as in an instance where a regional maximum slope is associated with a one-way street, in which case the vehicle should only use such a roadway in one direction.

If a slope is determined that meets or exceeds the maximum slope, example process 400 may continue to example process 500, which is discussed in more detail with reference to FIG. 5. After example process 500 is completed, example process 400 may return to operation 412, at which point a new ground profile may be determined using the new sensor data subset determined according to process 500. This process (operations 412 and 422 and process 500) may be iterated until an end condition, such as reaching a set number of iterations, reaching a point associated with an end of the trajectory, reaching a distance along the trajectory, determining that the ground profile does not include any slopes that meet or exceed the maximum slope, determining no change in the size of the set between iterations, or the like.

If the vehicle does not determine that a slope along the ground profile meets or exceeds the maximum slope or if the end condition is reached, example process 400 may transition to operation 424.

At operation 424, example process 400 may comprise controlling the vehicle based at least in part on the most recently determined ground profile. The most recently determined ground profile may be the ground profile determined at operation 412 after a most recent iteration of operations 412 and 422 and process 500. Controlling the vehicle based at least in part on such a ground profile may include classifying sensor data as being associated with a ground classification or an object classification using the ground profile and validating or rejecting the trajectory. For example, sensor data within a threshold distance of the ground profile may be associated with the ground classification and other sensor data that doesn't meet this criteria and has an elevation greater than the ground profile may be classified as being associated with an object. In some examples, the threshold distance may include a static distance (e.g., 1 centimeter, 0.5 centimeters) and/or a distance that is set based at least in part on a confidence or residual error associated with the ground profile. For example, residual error(s) determined as part of fitting the ground profile to the sensor data may be used to determine the threshold distance. In such an example, the threshold distance may be capped at a maximum distance, such as 1 centimeter, 5 centimeters, or the like to avoid false negative detections of small objects.

Operation 424 may include determining a position and/or velocity associated with at least a closest object to the vehicle. For example, operation 422 may comprise determining a velocity of an object based at least in part on accumulating sensor data associated with the object over time. In an additional or alternate example, determining the velocity of the object may be based at least in part on a doppler value indicated by a radar device, sonar device, and/or the like. In some examples, operation 422 may comprise determining a position and/or velocity associated with additional objects classified as objects. In some instances, operation 422 may additionally or alternatively comprise determining one or more predicted positions of at least the closest object based at least in part on a velocity associated with the object. Operation 422 may additionally or alternatively include determining the closest object based at least in part on current and/or predicted positions of one or more objects and determining which object is or is predicted to be closest to the position 408 of the autonomous vehicle.

At operation 424, example process 400 may comprise determining whether a closest object is at a position or is predicted to be at a position that meets or exceeds a threshold distance to the trajectory and/or to the vehicle, according to any of the techniques discussed herein. Operation 424 may comprise the threshold distance based at least in part on the trajectory. For example, the threshold distance may correspond with a maximum stopping distance of the vehicle and may include an additional safety margin in addition to the maximum stopping distance in some instances. In some examples, the threshold distance may be a distance along a line or curve associated with the trajectory. Operation 424 may comprise determining whether an object is or will be within less than the threshold distance of the vehicle (or a predicted position of the vehicle).

If an object is and/or is predicted to be at a position that is less than the threshold distance of the autonomous vehicle, operation 424 may comprise causing the vehicle to execute a contingent trajectory and/or re-determine a trajectory, according to any of the techniques discussed herein. For example, causing the vehicle to execute a contingent trajectory may comprise transmitting instructions to a system controller to cause the vehicle to slow down, execute a safe-stop maneuver, hard-brake, and/or the like. In some examples, the planner may determine the contingent trajectory and transmit the contingent trajectory to the trajectory verification component with the trajectory and/or upon request by the trajectory verification component. In an additional or alternate example, if an object is and/or is predicted to be at a position that is less than the threshold distance of the autonomous vehicle, operation 424 may comprise transmitting a request to the planner to determine a new trajectory.

If no object is and/or is predicted to be within the threshold distance of the autonomous vehicle, operation 424 may validate the trajectory. Additionally or alternatively, in such an instance, operation 424 may conduct an additional check, which may include determining whether a furthest ground data point is at a distance that meets or exceeds the threshold distance (this may be the same or a different threshold distance than the distance from the object), according to any of the techniques discussed herein. The furthest ground data point may be a sensor data point classified as being ground that is at a furthest, or one of the furthest, ground data points from the position (or predicted position) of the autonomous vehicle. This may functionally be a check to ensure that there is sensor data far enough from the autonomous vehicle to ensure that the autonomous vehicle could stop before hitting any objects and has detected any objects within the autonomous vehicle's stopping distance, plus some margin in some instances.

If operation 424 includes validating the trajectory, the trajectory may be passed to the controller(s) of the autonomous vehicle causing the autonomous vehicle to execute the trajectory (e.g., by transmitting the trajectory to system controller(s)).

Figure 5:
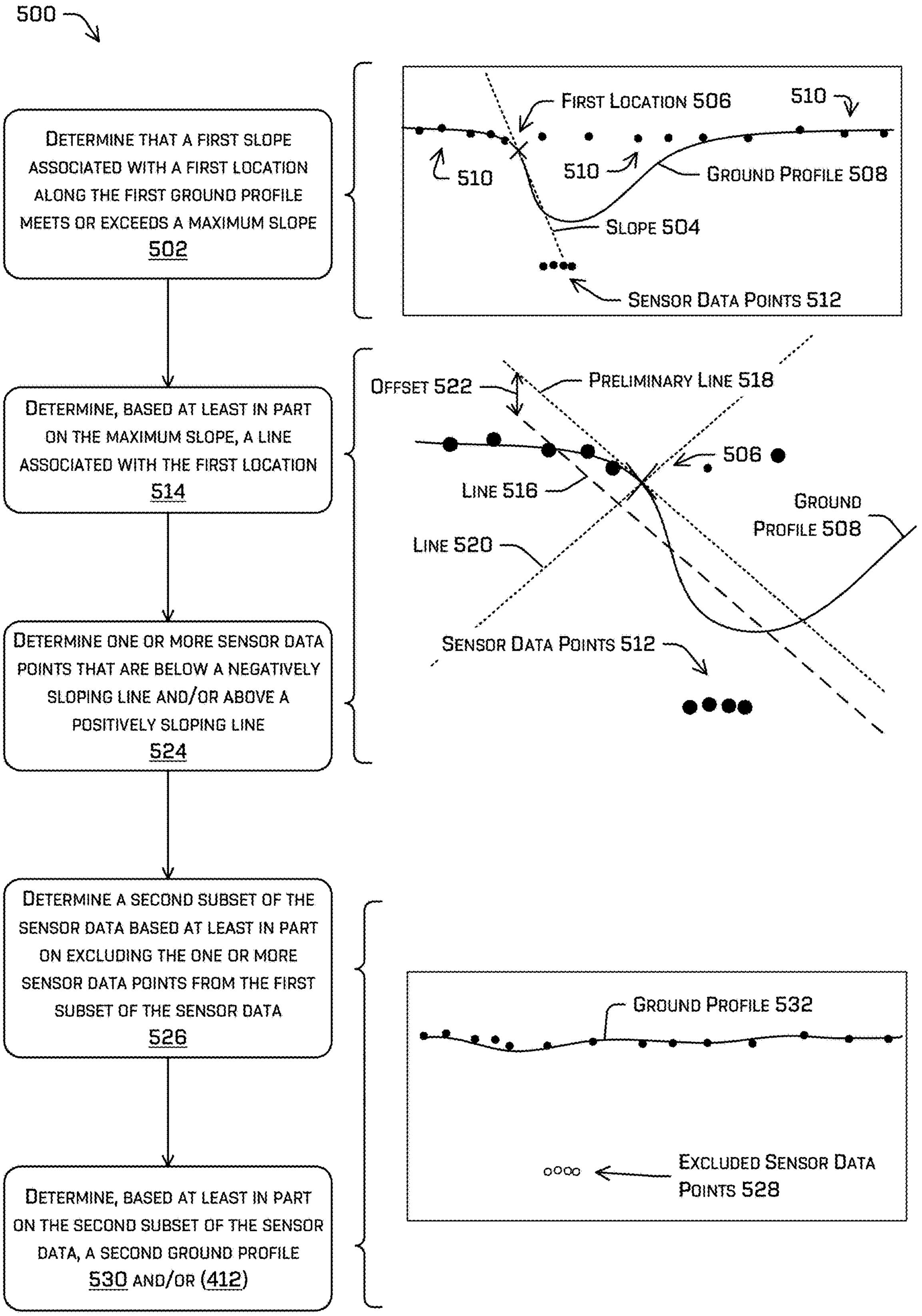
FIG. 5 illustrates a pictorial flow diagram of an example process for correcting an inaccurate ground profile, in particular an example process for excluding sensor data point(s) that are contributing to the inaccurate ground profile.

FIG. 5 illustrates a pictorial flow diagram of an example process 500 for correcting an inaccurate ground profile, in particular by excluding sensor data point(s) that are contributing to the inaccurate ground profile. Example process 500 may receive a first subset of sensor data and a first ground profile and may determine to exclude one or more sensor data points thereof, resulting in a second subset of sensor data that may be used to determine a new ground profile. In some examples, example process 500 may stand-alone or, in other examples, example process 500 may be part of example process 400.

At operation 502, example process 500 may comprise determining that a first slope 504 associated with a location 506 along a first (estimated) ground profile 508 meets or exceeds a maximum slope, according to any of the techniques discussed herein. For example, determining the slope may be part of determining the ground profile 508 or, an additional or alternate example, determining the slope may include determining a slope at regularly intervals along the ground profile, starting at or near a location of the vehicle. FIG. 5 depicts the slope 504 as a dashed line, the location as an "x," the ground profile 508 as a solid line, and sensor data as filled-in dots. The sensor data includes valid sensor data points 510 and inaccurate sensor data points 512. The vehicle does not need an indication that sensor data points 512 are inaccurate to successfully exclude these points. The technique described herein results in excluding these points without such prior indication.

At operation 514, example process 500 may comprise determining, based at least in part on the maximum slope, a line 516 associated with the location 506, according to any of the techniques discussed herein. Determining the line may comprise determining a line 518 having a slope equal to the maximum slope. In some examples, operation 514 may include determining two such lines one with a negative maximum slope, e.g., line 518, and one with a positive maximum slope, e.g., line 520. In some examples, either line may originate at or pass through the location 506 and may be considered a preliminary line in examples where a vertical offset is further applied to the line(s). In some examples, the final line, e.g., line 516, may be determined by applying a negative vertical offset, such as offset 522, to a negatively sloped line, such as line 516; and/or applying a positive vertical offset to a positively sloped line, such as line 520. Note that no positive offset and resultant line are depicted in FIG. 5 for the sake of clarity. The offset may be applied to the line to avoid excluding valid sensor data points that are close to the location 506. Note that a positively-sloped line may prevent trees from being treated as being part of the ground when the ground profile has a positive slope that meets or exceeds the maximum slope.

At operation 524, example process 500 may comprise determining one or more sensor data points are below a negatively sloping line and/or above a positively sloping line, according to any of the techniques discussed herein. For example, operation 524 may include determining a sensor data point having an elevation less than elevations defined by a negatively-sloped line and/or a sensor data point having an elevation greater than elevations defined by a positively-sloped line. In the depicted example, this may result in identifying sensor data points 512 since they are below line 516 (i.e., the line being negatively vertically offset from the line having the maximum slope passing through the location).

In some examples, determining the sensor data points on an opposite side of a line may be limited to sensor data points that are longitudinally beyond the location 506 from the vehicle, where longitude is referenced along the trajectory. In other words, those points that have a displacement along the trajectory greater than a displacement along the trajectory associated with the location 506. For example, this may be the sensor data points lying to the right of the location 506 in the illustration.

At operation 526, example process 500 may comprise determining a second subset of the sensor data based at least in part on excluding the one or more sensor data points (determined at operation 524) from the first subset of the sensor data, according to any of the techniques discussed herein. Excluding the one or more sensor data points 528 from the first subset may include masking, deleting, or down-weighting such sensor data points. Down-weighting such sensor data points may include down-weighting the excluded sensor data points 528 during the ground profile generation at operation 530/operation 412.

At operation 530, example process 500 may return to operation 412, which may comprise determining, based at least in part on the second subset of the sensor data, a second (new) ground profile 532, according to any of the techniques discussed herein. The resultant portion of the ground profile 532 near the excluded sensor data points 528 may no longer have a slope that meets or exceeds the maximum slope, thereby correcting the ground profile and decreases false positive and/or false negative detections of objects in an environment associated with the vehicle.

Example System

Figure 6:
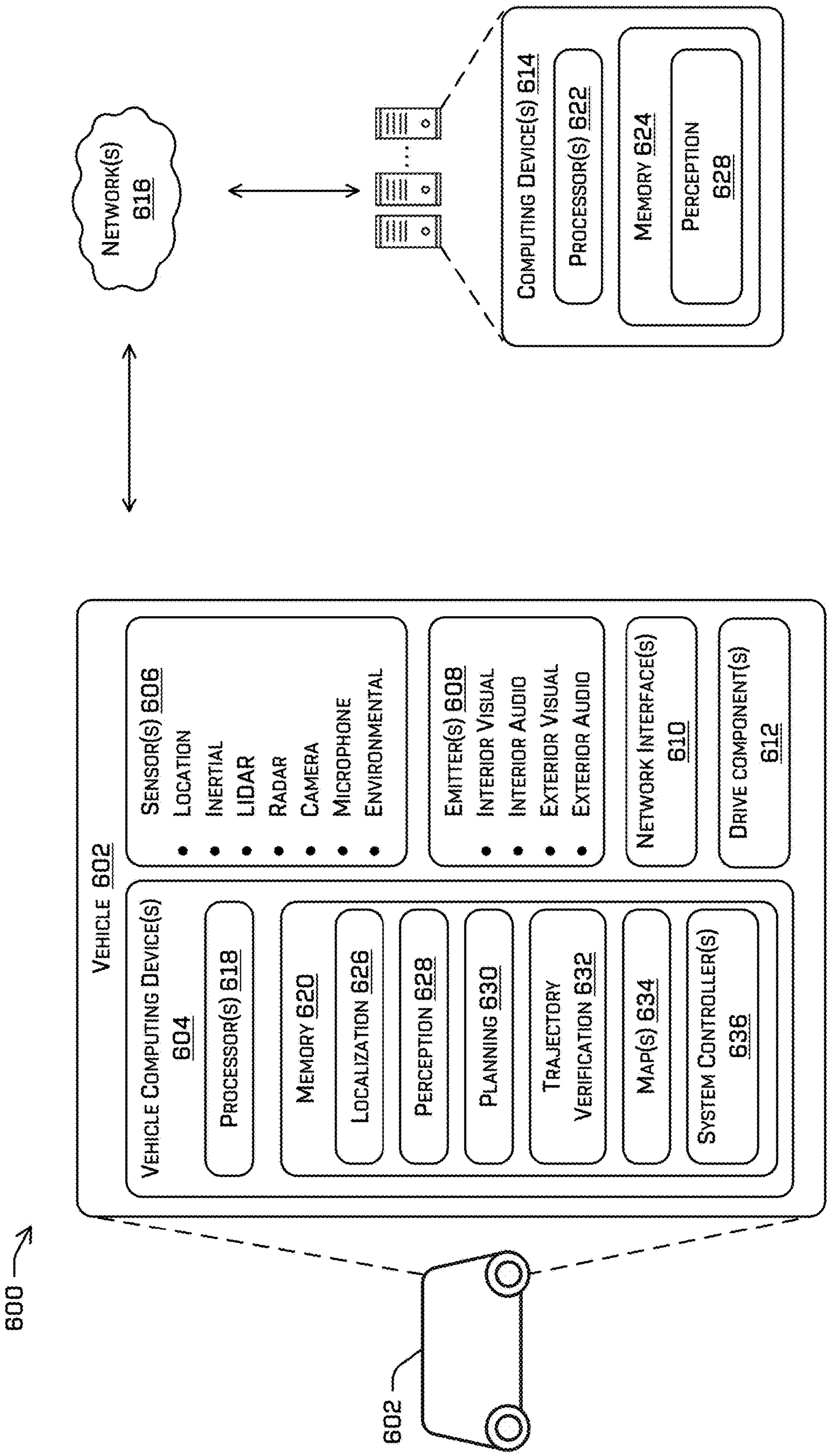
FIG. 6 illustrates a block diagram of an example system comprising a perception component that may correct a ground profile when inaccurate sensor data has been received.

FIG. 6 illustrates a block diagram of an example system 600 that implements the techniques discussed herein. In some instances, the example system 600 may include a vehicle 602, which may represent the vehicle 102 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well.

The vehicle 602 may include a vehicle computing device(s) 604, sensor(s) 606, emitter(s) 608, network interface(s) 610, and/or drive component(s) 612. Vehicle computing device(s) 604 may represent computing device(s) 106 and sensor(s) 606 may represent sensor(s) 104. The system 600 may additionally or alternatively comprise computing device(s) 614.

In some instances, the sensor(s) 606 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 614.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). For instance, the network interface(s) 610 may facilitate communication with other local computing device(s) on the vehicle 602 and/or the drive component(s) 612. Also, the network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 614. In some examples, computing device(s) 614 may comprise one or more nodes of a distributed computing system (e.g., a cloud computing architecture).

The network interface(s) 610 may include physical and/or logical interfaces for connecting the vehicle computing device(s) 604 to another computing device or a network, such as network(s) 616. For example, the network interface(s) 610 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 604 and/or the sensor(s) 606 may send sensor data, via the network(s) 616, to the computing device(s) 614 at a particular frequency, after a lapse of a predetermined period of time, in near real-time, etc.

In some instances, the vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 612 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s).

The vehicle computing device(s) 604 may include processor(s) 618 and memory 620 communicatively coupled with the one or more processors 618. Memory 620 may represent memory 108. Computing device(s) 614 may also include processor(s) 622, and/or memory 624. The processor(s) 618 and/or 622 may be any suitable processor capable of executing instructions to process data and perform operations as described herein. By way of example and not limitation, the processor(s) 618 and/or 622 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 620 and/or 624 may be examples of non-transitory computer-readable media. The memory 620 and/or 624 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 620 and/or memory 624 may store a localization component 626, perception component 628, planning component 630, trajectory verification component 632, map(s) 634, and/or system controller(s) 636. Perception component 628 may represent perception component 110, planning component 630 may represent planning component 112, and/or trajectory verification component 632 may represent trajectory verification component 114.

In at least one example, the localization component 626 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 626 may include and/or request/receive map(s) 634 of an environment and can continuously determine a location, velocity, and/or orientation of the autonomous vehicle within the map(s) 634. In some instances, the localization component 626 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 626 may provide data to various components of the vehicle 602 to determine an initial position of an autonomous vehicle for generating a trajectory and/or for generating map data, as discussed herein. In some examples, localization component 626 may provide, to the trajectory verification component 632, a location and/or orientation of the vehicle 602 relative to the environment and/or sensor data associated therewith.

In some instances, perception component 628 may comprise a primary perception system and/or a prediction system implemented in hardware and/or software. The perception component 628 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 628 is referred to as perception data.

The planning component 630 may receive a location and/or orientation of the vehicle 602 from the localization component 626 and/or perception data from the perception component 628 and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 636 and/or drive component(s) 612 may parse/cause to be carried out, second instructions for the emitter(s) 608 may be formatted according to a second format associated therewith).

The trajectory verification component 632 may operate on the vehicle 602 and/or on the computing device(s) 614. In some examples, the trajectory verification component 632 may be downstream (receive an output) from the planning component 630 in a pipeline. The trajectory verification component 632 may be configured to pass all, part, or none of the output of the planning component 630, depending on the determinations discussed herein, to system controller(s) 636 for implementation. In some examples, the trajectory verification component 632 may comprise a feedback loop for providing input to the planning component 630, such as a flag or message that triggers re-determination of a trajectory.

The memory 620 and/or 624 may additionally or alternatively store a mapping system (e.g., generating a map based at least in part on sensor data), a planning system, a ride management system, etc. Although localization component 626, perception component 628, planning component 630, map(s) 634, and/or system controller(s) 636 are illustrated as being stored in memory 620, any of these components may include processor-executable instructions, machine-learned model(s) (e.g., a neural network), and/or hardware and all or part of any of these components may be stored on memory 624 or configured as part of computing device(s) 614.

As described herein, the localization component 626, the perception component 628, the planning component 630, and/or other components of the system 600 may comprise one or more ML models. For example, the localization component 626, the perception component 628, and/or the planning component 630 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNeXt.

Memory 620 may additionally or alternatively store one or more system controller(s) 636, which may be configured to control steering, propulsion, braking, safety, emitters, communication, and other systems of the vehicle 602. These system controller(s) 636 may communicate with and/or control corresponding systems of the drive component(s) 612 and/or other components of the vehicle 602. For example, the planning component 630 may generate instructions based at least in part on perception data generated by the perception component 628, which the trajectory verification component 632 may validate and/or transmit to the system controller(s) 636. The system controller(s) 636 may control operation of the vehicle 602 based at least in part on the instructions received from the planning component 630 and/or trajectory verification component 632. In some examples, the trajectory verification component 632 may replace instructions generated by the planning component 630 with alternate instructions associated with a contingent trajectory such as, for example, a contingent trajectory that may specify an alternate maneuver, and/or the like.

It should be noted that while FIG. 6 is illustrated as a distributed system, in alternative examples, components of the vehicle 602 may be associated with the computing device(s) 614 and/or components of the computing device(s) 614 may be associated with the vehicle 602. That is, the vehicle 602 may perform one or more of the functions associated with the computing device(s) 614, and vice versa.

Figure 7:
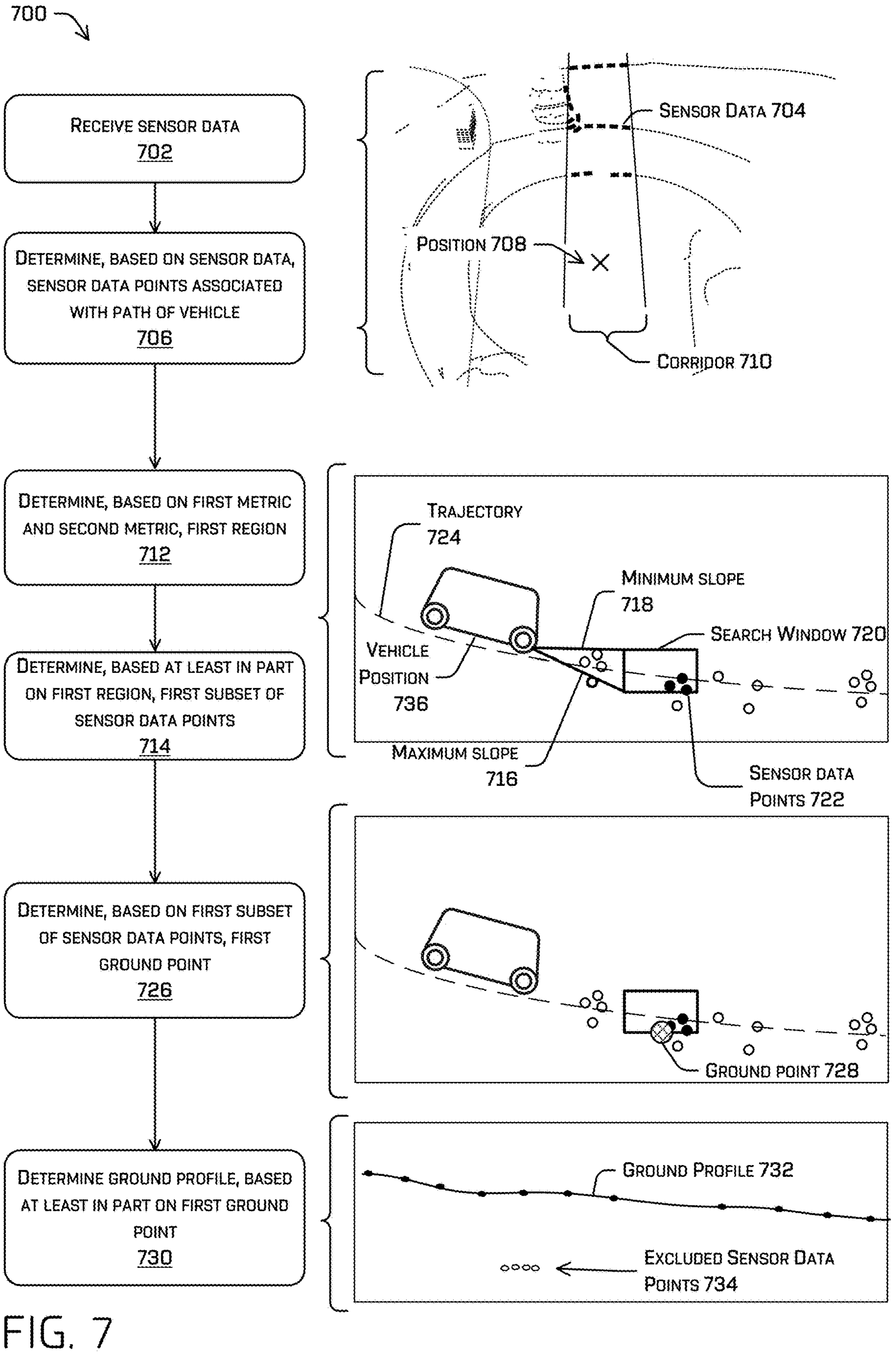
FIG. 7 illustrates a pictorial flow diagram of an example process for determining a ground point, and determining a ground profile including the ground point.

FIG. 7 illustrates a pictorial flow diagram of an example process 700 for determining a ground point 728, and determining a ground profile 732 including the ground point 728, based at least in part on sensor data received at a vehicle. The example process 700 may further include validating and/or correcting an existing ground profile. In some examples, example process 700 may be conducted iteratively, as discussed further herein.

At operation 702, the process 700 may comprise receiving sensor data from a sensor associated with a vehicle, such as an autonomous vehicle, according to any of the techniques discussed herein. For example, the sensor data 704 may comprise lidar and/or radar data, among other types of sensor data. The techniques may be used for a variety of sensor data types and may not be limited to light-based sensors. In some examples, the sensor data may comprise Doppler data associated with detected surfaces, and/or any other type of sensor data that indicates the position of objects in the environment surrounding the autonomous vehicle. Additionally, or alternatively, the sensor data 704 may be associated with the entire environment of the vehicle, or a portion of the environment (e.g., within corridor 710, along trajectory 724, etc.)

At operation 706, the process 700 may comprise determining, based on the sensor data, sensor data points associated with a path of the vehicle. The path may include a trajectory, such as trajectory 724 illustrated at operation 712, though not shown in relation to operation 706 and/or other operations to increase clarity of the diagrams. For example, the trajectory (hereinafter "trajectory 724") may be implemented by the vehicle unless it is rejected by a trajectory verification component of the vehicle. In some examples, at operation 706, the trajectory 724 may be simplified to a set of waypoints, i.e., discrete locations, through which the vehicle is to travel. The discussion herein may use one or more waypoints (locations within an environment) instead of or in addition to a path or trajectory, as discussed herein, although a trajectory 724 is referenced for simplicity. The disclosure is not intended to limit the disclosure to a trajectory 724 alone but may use waypoint(s) and/or path in addition or alternatively. In some examples, determining the waypoints based at least in part on the trajectory 724 may include determining the waypoints based at least in part on a set of controls associated with the trajectory 724 for controlling motion of the vehicle. In yet another example, the set of waypoint(s) may be received from a first system without needing to determine the waypoint(s) from a trajectory 724 or set of trajectories.

For example, the trajectory 724 may identify a rate of steering, acceleration, and/or the like for controlling motion of the vehicle. In some examples, the trajectory 724 may comprise a current and/or planned position and/or velocity of the autonomous vehicle. In some examples, the perception system (whether it's the primary or a secondary perception system) may additionally or alternatively receive a current pose (i.e., position and/or orientation) of the vehicle, such as position 708. For example, the current pose may be received from a localization component and the trajectory 724 may be received from a planning component and/or one or more sensors of the autonomous vehicle (e.g., wheel encoders, GPS). Of course, in other examples, 2- or 3-dimensional waypoints, lines, curves, polygons, surfaces, or otherwise may be used to represent the path (or portion thereof) the vehicle plans to travel.

In an additional or alternate example, the vehicle may additionally or alternatively receive a path that the vehicle has planned to travel from an origination point to a termination point. For example, the path may define a lane or portion of a roadway that the vehicle plans to occupy from the origination point to the termination point. The origination point may be an original point from which the vehicle started travelling or a current position and/or pose of the vehicle and the termination point may be an intermediate point on a route (e.g., an end of a block; a set number of meters; a location associated with a next operation, such as executing a turn, or merging onto a highway) or a final destination for the route. The route may define the overarching plan to accomplish a mission, such as the sequence of maneuvers and roadways the vehicle is to complete to navigate from a starting position to a final destination.

In examples where the ground profile is limited to a trajectory, the perception system may determine a corridor 710 associated with the trajectory 724 (and/or waypoints and/or path). In some examples, determining the corridor may be based at least in part on the trajectory 724, a width and/or length of the autonomous vehicle, a distance in the direction of travel of the vehicle, a current velocity, a buffer (e.g., additional width and/or length), and/or an offset (e.g., a distance from a current position). In at least some examples, such corridor dimensions may be based on, for example, parameters associated with the vehicle. As a non-limiting example, the length of the corridor may be a function of the velocity of the vehicle, whereas the width, as another example, may be based on a turning radius of the vehicle, likely speeds associated with objects in the vicinity of the vehicle, and the like. Additionally, or alternatively, the sensor data 704 may include an indication of the position 708 of the vehicle.

At operation 712, the example process 700 may comprise determining, based on a first metric and a second metric, a first region. By way of example, and not limitation, a first metric such as maximum slope 716 and a second metric such as minimum slope 718 may be used to determine the upper and/or lower bounds (e.g., a lower bound height and/or an upper bound height) of a region, such as search window 720. Although search window 720, as depicted in FIG. 7, may be in the shape of a quadrilateral, the search window 720 may comprise any shape, and/or bin (e.g., a discretized range of values), having an upper and/or lower bound. In some examples, the maximum slope 716 may be a static number stored in memory associated with a global maximum of a roadway (e.g., the slope of the steepest roadway in the world, 37.45 degrees, 40 degrees), a regional maximum slope and/or of a roadway (e.g., a steepest slope in the country, county, or city in which the vehicle is operating, etc.). The maximum slope 716 may include an absolute value of the maximum slope i.e., an absolute value of a negative slope or an absolute value of a positive slope may exceed a negative maximum slope or a positive maximum slope. Additionally, or alternatively, the maximum slope 716 of the example process 700 may be determined based on the vehicle position 736 (e.g., the height of the vehicle from the ground, the slope of the vehicle, based on map data, and/or the like). Additionally, or alternatively, the minimum slope 718 may be a static number stored in memory associated with a global minimum of a roadway, a regional minimum slope and/or of a roadway, etc. The minimum slope 718 may include an absolute value of the minimum slope—i.e., an absolute value of a negative slope or an absolute value of a positive slope may exceed a negative minimum slope or a positive minimum slope. Additionally, or alternatively, the minimum slope 718 of the example process 700 may be determined based on the vehicle position 736.

Additionally, or alternatively, the maximum slope 716 and minimum slope 718, and/or upper and lower bounds of the search window 720, may be determined and/or adjusted based on a rate of ground slope change. The rate of ground slope change may be pre-determined static number stored in memory associated with a rate of ground slope change (e.g., eight degrees per meter). As illustrated in the example process 700, where the vehicle may be traveling in a downward direction, the lower bounds of the search window 720 may be determined based on a maximum slope 716 from the vehicle position 736 (e.g., the steepest possible slope of the road in the negative direction). Additionally, or alternatively, the minimum slope 718 may be determined and/or adjusted based on a rate of ground slope change (e.g., eight degrees per meter). For example, the minimum slope 718 and/or an upper bound of the search window 720 may be limited, or constrained, by a maximum ground slope change, as it may be unlikely for the ground profile to change in height quickly and drastically. Additionally, or alternatively, the minimum slope 718 may not indicate the magnitude, and/or or value, of the slope, but instead the lowest slope. For example, a minimum slope may be a value of a slope in a negative direction (e.g., −10 degree slope, −30 degree slope, etc.). In another example, where the vehicle may be traveling in an upward direction, the lower bounds of the search window 720 may be determined based on a maximum slope 716 in the positive direction from the vehicle position 736. Additionally, or alternatively, the minimum slope 718 may be determined and/or adjusted based on the rate of ground slope change (e.g., eight degrees per meter) in the negative and/or positive direction from the vehicle position 736.

Additionally, or alternatively, while the maximum slope 716 and/or minimum slope 718 may be used to determine the upper and lower bounds of the search window 720 (e.g., the height of the search window 720) the search window 720 may be further defined based on the size of the vehicle (e.g., vehicle width) and/or a lateral threshold distance along the distance of the trajectory 724. In some instances, the search window 720 may be further defined based on a threshold longitudinal distance along the distance of the trajectory. For example, the size of the search window 720 may be smaller when below a threshold longitudinal distance (e.g., closer to the vehicle) and larger when above a threshold longitudinal distance (e.g., further away from the vehicle). In one example, the threshold longitudinal distance may be a constant distance for each search window 720 (e.g., one meter for each search window 720). In some examples, the search window 720 may be based on the speed of the vehicle. For example, the size of the search window 720 may be increased when the vehicle is at higher speeds (e.g., when the road is more likely to be flat).

At operation 714, the example process 700 may comprise determining, based at least in part on the first region, a first subset of sensor data points. As illustrated, the search window 720 may include a subset of sensor data points, such as sensor data points 722, that fall within the search window 720. Sensor data points 722 may be associated with a lidar sensor return indicating a surface, object, etc.

At operation 726, the example process 700 may comprise determining, based on the first subset of sensor data points, a first ground point. Operation 726 may additionally or alternatively comprise an algorithm that averages (i.e., takes the mean of) the heights, elevations, and/or positions associated with the sensor data points 722 that are included in the search window 720 in order to determine a ground point 728. In some examples, the algorithm may be configured to subtract two standard deviations of the heights associated with the sensor data points 722 from the average determined by the algorithm, to determine the height, elevation, and/or position associated with the ground point 728. In some examples, the algorithm may be a weighted algorithm (e.g., using the weights determined in association with the sensor data points 722 based at least in part on the elevations of the sensor data points 722). In some examples, a weight associated with a sensor data point 722 may be determined based at least in part on the elevation of the sensor data point 722 being within a threshold distance laterally and/or longitudinally to the trajectory 724. For example, the closer in distance a sensor data point 722 may be to the trajectory 724 (e.g., based on the lateral distance to the closet point on the trajectory 724), the more likely the sensor data point 722 may be associated with ground and therefore may have a greater weight associated therewith.

At operation 730, the example process 700 may include determining a ground profile based at least in part on the first ground point. The ground profile 732 may identify an estimate of a topography of the ground along the trajectory 724, according to any of the techniques described herein, such as those described with respect to FIGS. 8A and 8B. Additionally, or alternatively, the ground profile 732 may be used to determine excluded sensor data points 734 based on the excluded sensor data points 734 being outside a threshold distance from the ground profile 732. Based on the excluded sensor data points 734 being outside a threshold distance from the ground profile 732, the excluded sensor data points 734 may not be included as part of the ground profile, and thus may be included as perception data and may be used for object detections. For example, the excluded sensor data points 734 may be included as perception data and may be used to detect an object, such as a pedestrian, obstruction, vehicle, and/or the like. Based on the detected object, the vehicle maybe controlled accordingly. While illustrated below the ground profile 732 (e.g., in instances where road conditions may cause a reflection and lidar return from below the ground profile 732), the excluded sensor data points 734 may also be above the ground profile 732.

Figure 8A:
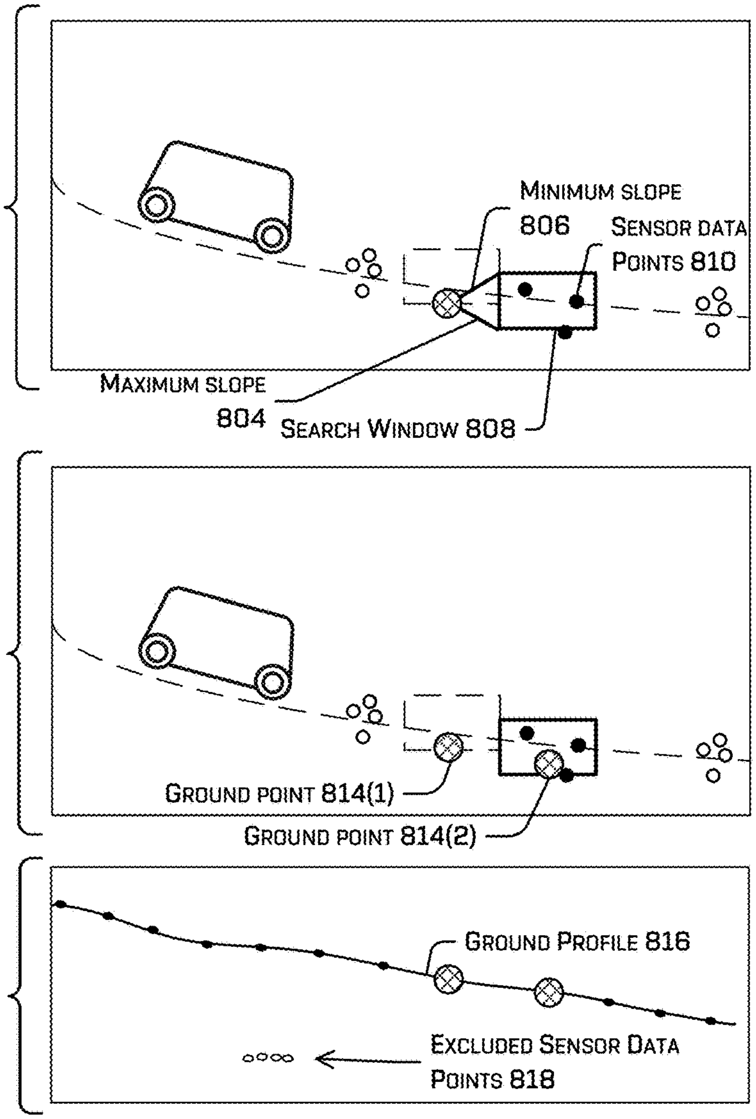
FIG. 8A illustrates a pictorial flow diagram of an example process for determining multiple ground points, and determining a ground profile including the ground points.

FIG. 8A illustrates a pictorial flow diagram of an example process 800 for determining multiple ground points 814, and determining a ground profile 816 including the ground points 814. The example process 800 further includes validating and/or correcting an existing ground profile. In some examples, the example process 800 may be conducted iteratively, as discussed further herein. In some examples, the example process 800 may be conducted by a primary perception system of the vehicle. In an additional or alternative example, the example process 800 may be executed by a secondary perception system of the vehicle, such as a perception component of a trajectory verification component or other systems that rely on a high accuracy ground profile.

At operation 802, the example process 800 may comprise determining, based on a third metric and a fourth metric, a second region, wherein the second region includes a second subset of the sensor data points. As described above with respect to FIG. 7, metrics such as maximum slope 804 (e.g., a third metric) and a minimum slope 806 (e.g., a fourth metric) may be used to determine the upper and/or lower bounds of a second region, such as search window 808. In some examples, the maximum slope 804 of the example process 800 may be determined based on the height, elevation, and/or position of the previous ground point (e.g., ground point 814(1) or ground point 728 of FIG. 7). As illustrated in the example process 800, where the vehicle may be traveling in a downward direction, the lower bounds of the search window 808 may be determined based on a maximum slope 804 in the negative direction from the previously determined ground point 814(1) (e.g., the average height associated with the search window 720). Additionally, or alternatively, the minimum slope 806 may be determined and/or adjusted based on a rate of ground slope change (e.g., eight degrees per meter) from the previously determined ground point 814(1), and may be measured in a positive direction from the previously determined ground point 814(1) in those instances in which the ground slopes downward (from the frame of the vehicle) or negative in which the ground slopes upwards.

At operation 812, the example process 800 may comprise determining, based on the second subset of the sensor data points, a second ground point, wherein determining the ground profile is further based at least in part on the second ground point. As illustrated in the example process 800, the search window 808 may include one or more sensor data points 810. Sensor data points 810 may be associated with a lidar sensor return indicating a surface, object (e.g., a curb, signage, etc.) and/or the like. Operation 812 may additionally or alternatively comprise an algorithm that averages (i.e., takes the mean of) the heights, elevations, and/or positions associated with the sensor data points 810 that are included in the search window 808 in order to determine a ground point 814(2). Additional, or alternatively, operation 812 may comprise an algorithm that takes the minimum of the heights, elevations, and/or positions associated with the sensor data points 810 that are included in the search window 808 in order to determine the ground point 814(2). In some examples, the algorithm may be configured to subtract, or otherwise reduce, two standard deviations from the average determined by the algorithm, to determine the height, elevation, and/or position associated with the ground point 814(2). For example, two standard deviations may be subtracted, or otherwise reduced, from the average determined by the algorithm to further ensure an appropriate ground point height.

This process (operations 802 and 812, and the example process 700) may be iterated until an end condition, such as reaching a set number of iterations, reaching a point associated with an end of a trajectory, reaching a distance along the trajectory, and/or the like. Additionally, or alternatively, while the search windows, such as search window 808, as illustrated in the example process 800 may be iterated along the distance of the trajectory, the search windows may be positioned laterally on the trajectory (e.g., positioned on either side of the trajectory and/or extending three-dimensionally (3-D) from the trajectory). The search windows may similarly be determined based on a first maximum slope and a first minimum slope. In such an example, the maximum and minimum slopes may define a longitudinal constraint between the different search windows.

In some examples, a particular portion of the trajectory may be associated with a single lateral search window (e.g., which may expand to be commensurate with the width of the vehicle, the corridor, and/or some buffer), and in some examples, the portion of the trajectory may be associated with multiple (e.g., 2, 3, 4, or any number) of lateral search windows. In an example where there are multiple lateral search windows associated with the portion of the search trajectory, the techniques can include lateral searches that are associated with maximum and minimum lateral differences. Accordingly, the techniques can include defining one or more roll constraints associated with the different lateral search windows, which can be used to determine more detailed ground surfaces. Thus, the laterally positioned search windows may be used to determine a roll constraint (e.g., limitations on the change in roll associated with a ground profile), where the roll constraint may be used to determine ground points, such as ground point 814(1) and/or ground point 814(2). Additionally, or alternatively, roll constraints between multiple laterally positioned search windows, and/or adjacent lateral search windows that are associated with different search windows, may be determined and/or defined using an algorithm, such as a Hough transform. For example, the Hough transform may be used to define a slope (e.g., based on shapes of lines in sensor data points), and in turn, determine ground points, such as ground point 814(1) and/or ground point 814(2).

The ground profile 816 may be used to determine excluded sensor data points 818 based on the excluded sensor data points 818 being outside a threshold distance, such as a longitudinal threshold distance, from the ground profile 816. Based on the excluded sensor data points 818 being outside a threshold distance from the ground profile 816, the excluded sensor data points 818 may not be included as part of the ground profile, and thus may be included as perception data and may be used for object detections.

Figure 8B:
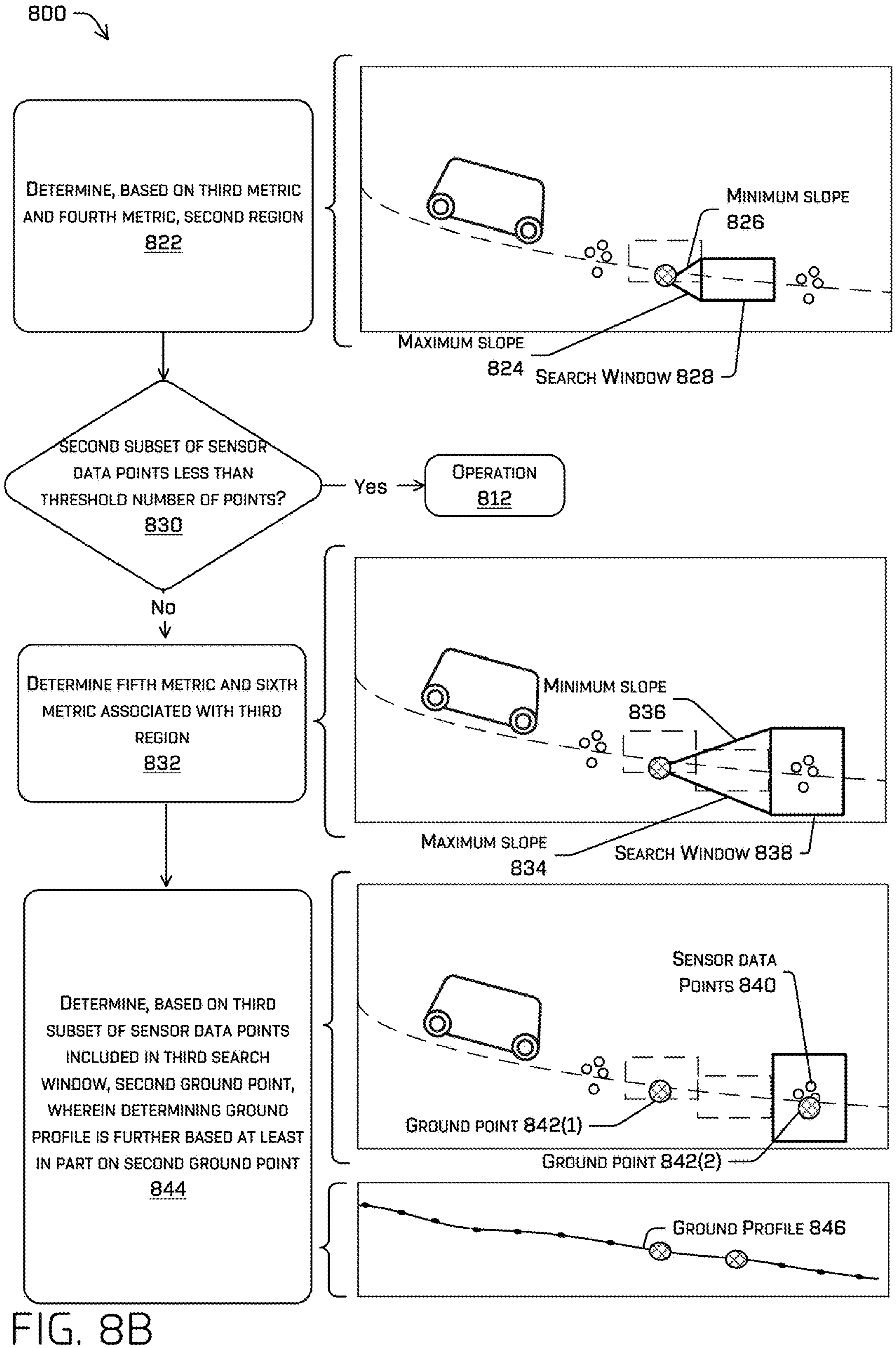
FIG. 8B illustrates a pictorial flow diagram of a continuation of the example process for determining multiple ground points, and determining a ground profile including the ground points.

FIG. 8B illustrates a pictorial flow diagram of a continuation of the example process 800 for determining multiple ground points 842 and determining a ground profile including the ground points 842. Particularly, ground point 842(2) may be determined based on a quantity of available sensor data points 840 included in a search window, such as search window 838.

At operation 822, the process 800 may comprise determining, based on a third metric and a fourth metric, a second region. As described above, the second region, such as search window 828 may be determined based on metrics such as maximum slope 824 and/or minimum slope 826, where the maximum slope 824 and/or minimum slope 826 may define the upper and/or lower bounds of the search window 828. As illustrated at operation 822, the maximum slope 824 and/or minimum slope 826 may be determined based on a previously determined ground point, such as ground point 842(1).

At operation 830, the process 800 may comprise determining whether a search window contains a second subset of sensor data points that is less than a threshold number of points. For example, the search window 828 may contain a second subset of sensor data points. However, as illustrated, in some instances the search window 828 may contain no sensor data points, or the second subset of sensor data points included in the search window 828 may be less than a threshold number of points. The threshold number of points may be a static value (e.g., minimum threshold of three sensor data points for a search window) or may be dynamic based on one or more conditions associated with the vehicle and/or the vehicle trajectory. At operation 830, the process 800 may further comprise determining that the search window 828 contains a second subset of sensor data points that meets and/or exceeds the threshold number of points (e.g., more than three sensor data points). Based on the second subset of sensor data points in the search window 828 meeting and/or exceeding the threshold number of points, the process 800 may proceed to operation 812, where a second ground point may be determined based on the second subset of sensor data points included in the search window 828. Based on the second subset of sensor data points in the search window 828 being below the threshold number of points, the process 800 may proceed to operation 832.

At operation 832, the process 800 may comprise determining a fifth metric and a sixth metric associated with a third search window. For example, a fifth metric, such as maximum slope 834, and/or a sixth metric, such as minimum slope 836, may be determined based on the maximum slope 824 and/or the minimum slope 826. By way of example, and not limitation, in an example where the minimum slope 826 is based on a rate of ground slope change of eight degrees per meter, the minimum slope 836 may extend the minimum slope 826 by another eight degrees per meter, for a minimum slope 826 of 16 degrees in the positive direction from the previous ground point 842(1). The maximum slope 834 may similarly extend the maximum slope 824 by a global maximum, regional maximum, etc. in the negative direction from the previous ground point 842(1). Based on the maximum slope 834 and/or the minimum slope 836, a region, such as search window 838, may be determined, where the search window 838 may include sensor data points 840.

While FIG. 8B illustrates search window 838 as having sensor data points 840 that may be at and/or above the threshold number of points, in instances where search window 838 may not have sensor data points 840 that are at and/or above the threshold number of points, operation 832 may be iterated until a search window with sensor data points at and/or above the threshold number of points is determined. Additionally, or alternatively, while FIG. 8B illustrates iterating operation 832 such that the search window 838 has a greater height, in some instances, the search window 838 may be expanded longitudinally (e.g., along the length of the trajectory).

At operation 844, the process 800 may comprise determining, based on a third subset of the sensor data points included in the third search window, a second ground point, wherein determining the ground profile is further based at least in part on the second ground point. As illustrated in the example process 800, the search window 838 may include one or more sensor data points 840. Sensor data points 840 may be associated with a lidar sensor return indicating a surface, object, etc. Operation 844 may additionally or alternatively comprise an algorithm that averages (i.e., takes the mean of) the heights, elevations, and/or positions associated with the sensor data points 840 that are included in the search window 838 in order to determine a ground point 842(2). In some examples, the algorithm may be configured to subtract two standard deviations from the average determined by the algorithm, to determine the height, elevation, and/or position associated with the ground point 842(2). Upon the determination of ground point 842(2), the process 800 may proceed where a ground profile 846 may be determined that includes the ground point 842(1) and the ground point 842(2).

Figure 9:
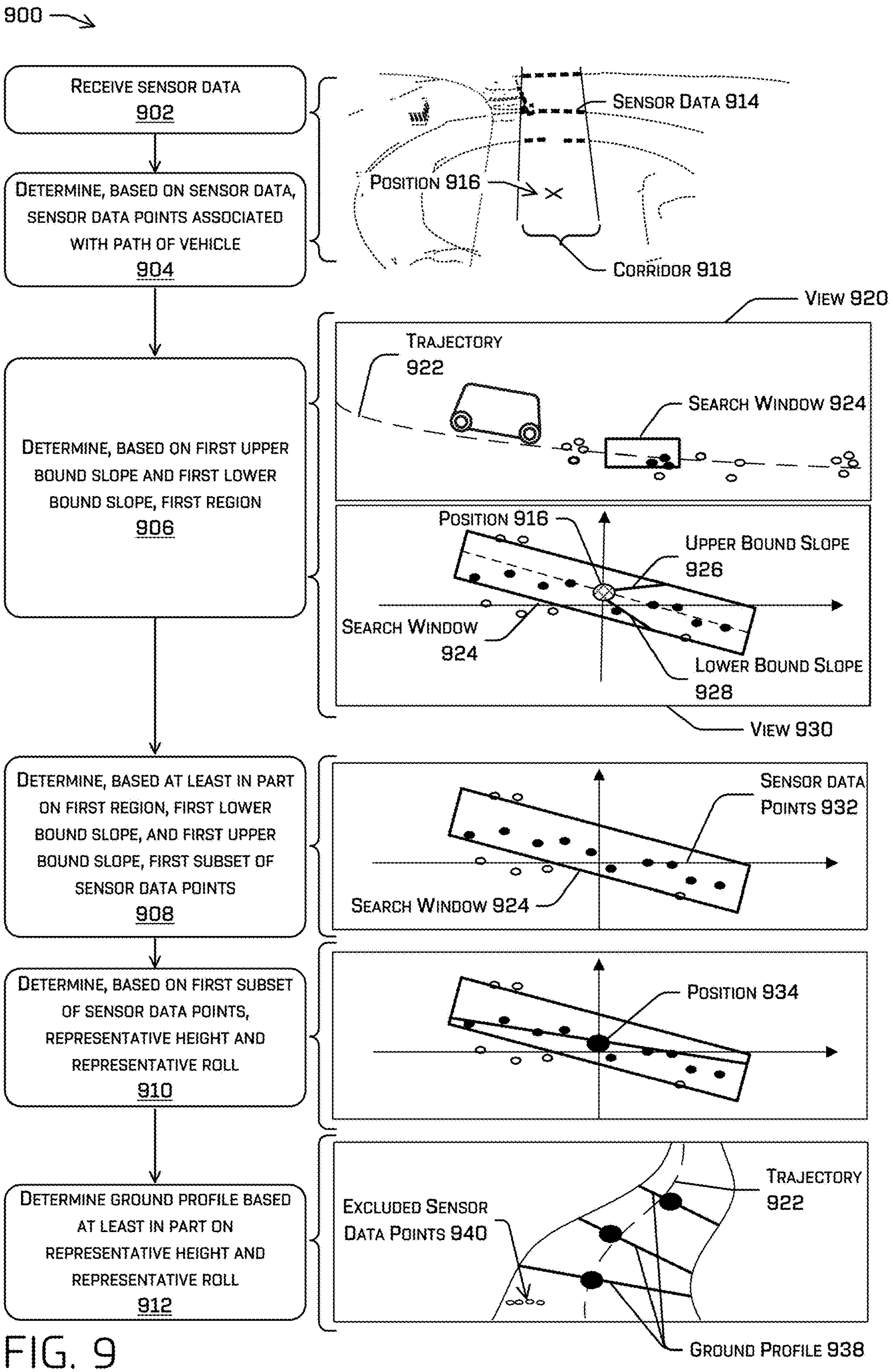
FIG. 9 illustrates a pictorial flow diagram of an example process for determining a multi-dimensional ground profile based at least in part on sensor data received at a vehicle.

FIG. 9 illustrates a pictorial flow diagram of an example process 900 for determining a multi-dimensional ground profile 938 based at least in part on sensor data 914 received at a vehicle. The example process 900 may further include validating and/or correcting an existing ground profile. In some examples, example process 900 may be conducted iteratively, as discussed further herein. In some examples, the example process 900 may be conducted by a primary perception system of the vehicle. In an additional or alternative example, the example process 900 may be executed by a secondary safety system or a secondary perception system of the vehicle, such as a perception component of a trajectory verification component or other systems that rely on a high accuracy ground profile.

At operation 902, the process 900 may comprise receiving sensor data from a sensor associated with a vehicle, such as an autonomous vehicle, according to any of the techniques described herein. For example, the sensor data 914 may comprise lidar and/or radar data, among other types of sensor data. The techniques may be used for a variety of sensor data types and may not be limited to light-based sensors. In some examples, the sensor data may comprise Doppler data associated with detected surfaces, and/or any other type of sensor data that indicates the position of objects in the environment surrounding the autonomous vehicle. Additionally, or alternatively, the sensor data 914 may be associated with the entire environment of the vehicle, or a portion of the environment (e.g., within corridor 918, along trajectory 922, etc.)

At operation 904, the process 900 may comprise determining, based on the sensor data, sensor data points associated with a path of the vehicle. The path may include a trajectory, such as trajectory 922 illustrated at operation 906, though not shown in relation to operation 904 and/or other operations to increase clarity of the diagrams. For example, the trajectory (hereinafter "trajectory 922") may be implemented by the vehicle unless it is rejected by a trajectory verification component of the vehicle. In some examples, at operation 904, the trajectory 922 may be simplified to a set of waypoints, i.e., discrete locations (which may or may not include steering controls and/or acceleration controls associated with one or more waypoints), through which the vehicle is to travel. The discussion herein may use one or more waypoints (locations within an environment) instead of or in addition to a path or trajectory, as discussed herein, although a trajectory 922 is referenced for simplicity. The disclosure is not intended to limit the disclosure to a trajectory 922 alone but may use waypoint(s) and/or path in addition or alternatively. In some examples, determining the waypoints based at least in part on the trajectory 922 may include determining the waypoints based at least in part on a set of controls associated with the trajectory 922 for controlling motion of the vehicle. In yet another example, the set of waypoint(s) may be received from a first system without needing to determine the waypoint(s) from a trajectory 922 or set of trajectories.

For example, the trajectory 922 may identify a rate of steering, acceleration, and/or the like for controlling motion of the vehicle. In some examples, the trajectory 922 may comprise a current and/or planned position and/or velocity of the autonomous vehicle. In some examples, the perception system (whether it's the primary or a secondary perception system) may additionally or alternatively receive a current pose (i.e., position and/or orientation) of the vehicle, such as position 916. For example, the current pose may be received from a localization component and the trajectory 922 may be received from a planning component and/or one or more sensors of the autonomous vehicle (e.g., wheel encoders, GPS). Additionally, or alternatively, the current pose may include the roll, or lateral (e.g., side to side) slope, of the vehicle, and may be received from one or more sensors of the autonomous vehicle (e.g., inertial measurement unit (IMU)). Of course, in other examples, 2- or 3-dimensional waypoints, lines, curves, polygons, surfaces, or otherwise may be used to represent the path (or portion thereof) the vehicle plans to travel.

In an additional or alternate example, the vehicle may additionally or alternatively receive a path that the vehicle has planned to travel from an origination point to a termination point. For example, the path may define a lane or portion of a roadway that the vehicle plans to occupy from the origination point to the termination point (e.g., a line, a polygon, etc.). The origination point may be an original point from which the vehicle started travelling or a current position and/or pose of the vehicle and the termination point may be an intermediate point on a route (e.g., an end of a block; a set number of meters; a location associated with a next operation, such as executing a turn, or merging onto a highway) or a final destination for the route. The route may define the overarching plan to accomplish a mission, such as the sequence of maneuvers and roadways the vehicle is to complete to navigate from a starting position to a final destination.

In examples where the ground profile is limited to a trajectory, the perception system may determine a corridor 918 associated with the trajectory 922 (and/or waypoints and/or path). In some examples, determining the corridor may be based at least in part on the trajectory 922, a width and/or length of the autonomous vehicle, a distance in the direction of travel of the vehicle, a current velocity, a buffer (e.g., additional width and/or length), and/or an offset (e.g., a distance from a current position). In at least some examples, such corridor dimensions may be based on, for example, parameters associated with the vehicle. As a non-limiting example, the length of the corridor may be a function of the velocity of the vehicle, whereas the width, as another example, may be based on a turning radius of the vehicle, likely speeds associated with objects in the vicinity of the vehicle, and the like. Additionally, or alternatively, the sensor data 914 may include an indication of the position 916 of the vehicle.

At operation 906, the example process 900 may comprise determining, based on a first upper bound slope and a first lower bound slope, a first region. By way of example, and not limitation, the upper bound slope 926 and/or lower bound slope 928 may be metrics used to define the parameters of a region, such as search window 924. Although search window 924, as depicted in FIG. 9, may be in the shape of a quadrilateral, the search window 924 may comprise any shape, and/or bin (e.g., a discretized range of values) having an upper and/or lower bound. Additionally, or alternatively, while view 920 depicts search window 924 longitudinally along the length of the trajectory 922, the upper bound slope 926 and/or lower bound slope 928 may be used to define the search window 924 laterally, or as a cross-section, along the length of the trajectory 922, as depicted at view 930 with a graphical representation (i.e., with axes). This way, the search window 924 may be multi-dimensional.

In some examples, the upper bound slope 926 and/or lower bound slope 928 may be a static number stored in memory associated with a global maximum and/or minimum lateral slope, or roll, of a roadway (e.g., a steepest roll in the country, county, or city in which the vehicle is operating, etc.). Additionally, or alternatively, the upper bound slope 926 and/or lower bound slope 928 may be determined based on a rate of ground roll change. Ground roll change may refer to a change laterally (e.g., side-to-side) of the road. For example, some roadways may be banked, or laterally inclined, such that a vehicle traversing the roadway would be banked, or inclined, about its longitudinal axis. Accordingly, a degree of ground roll change may differ throughout a roadway and/or between roadways. For example, the search window 924 may be limited, or constrained by a maximum ground roll change, as it may be unlikely for the ground to change in roll quickly and drastically. The rate of ground roll change may be a predetermined static number, value, or metric stored in memory associated with a rate of ground roll change (e.g., two degrees per meter). Additionally, or alternatively, the upper bound slope 926 and/or the lower bound slope 928 may include an absolute value of the rate of ground roll change. As illustrated in the example process 900, where the vehicle is traveling along the trajectory 922 and the view 930 depicts the lateral view of the search window 924, the parameters of the search window 924 may be determined based on the upper bound slope 926 and lower bound slope 928, which may constrain the search window 924 to the maximum ground roll change, such as two degrees per meter, in both the negative and/or positive direction. In some instances, such bounds may be determined from a database and based at least in part on the geolocation (e.g., wherein different regions have different slopes). While in some instances, and as depicted in FIG. 9, the upper bound slope 926 and lower bound slope 928 may be associated with the same, or similar, rates of ground roll change, the upper bound slope 926 and lower bound slope 928 may be associated with different rates of ground roll change. By way of example, and not limitation, the upper bound slope 926 may be associated with a ground roll change of five degrees per meter in the positive direction, and the lower bound slope 928 may be associated with a ground roll change of four degrees per meter in the negative direction.

Additionally, or alternatively, the upper bound slope 926 and/or lower bound slope 928 may be determined based on the position 916. In some instances, the position 916 may be associated with a position of the vehicle. For example, position 916 may indicate the pitch of the vehicle (e.g., the height, or steepness, of the ground at which the vehicle is positioned) and/or the roll of the vehicle. Additionally, or alternatively, the position 916 may be associated with a previously-determined position of a previous search window. For example, using the techniques described herein, position 916 may represent a previously-determined position of a previous search window, or bin, that is longitudinally positioned with respect to the search window 924 and along the length of the trajectory 922. In other words, the position 916 may represent a pitch (e.g., height) and ground roll of a previous portion of the trajectory 922, where search window 924 may be used to determine the pitch and ground roll of a subsequent portion of the trajectory 922. Additionally, or alternatively, the operations of example process 900 may be performed iteratively to determine the ground profile 938 based on more than one positions of more than one search windows. As depicted in FIG. 9, the position 916 may include a pitch represented by the gridded circle and a roll, or lateral slope, represented by the dashed line. Accordingly, the upper bound slope 926 may be determined based on the rate of ground roll change in the positive direction from the position 916, and the lower bound slope 928 may be determined based on the rate of ground roll change in the negative direction from the position 916, or vice versa. As illustrated, the upper bound slope 926 may define the top of the search window 924, and the lower bound slope 928 may define the bottom portion of the search window 924. In some examples, while the upper bound slope 926 and/or lower bound slope 928 may be used to determine the parameters of the search window 924, where the search window 924 is defined by a width that extends laterally relative to the trajectory 922, the search window 924 may be further defined based on the size of the vehicle (e.g., vehicle width) and/or a lateral threshold distance along the distance of the trajectory 922. For example, lateral width of the search window 924 may expand to be commensurate with the width of the vehicle, the corridor 918, and/or some buffer.

At operation 908, the example process 900 may comprise determining, based at least in part on the first region, the first lower bound slope, and the first upper bound slope, a first subset of sensor data points. As illustrated, the search window 924 may include a subset of sensor data points, such as sensor data points 932, that fall within the search window 924. Sensor data points 932 may be associated with a lidar sensor return indicating a surface, object, etc. While not illustrated in FIG. 9, the operation 908 may further include determining whether the first subset of sensor data points, such as sensor data points 932, is less than a threshold number of points. For example, in some instances, the search window 924 may contain no sensor data points, or the sensor data points 932 included in the search window 924 may be less than a threshold number of points. The threshold number of points may be a static value (e.g., minimum threshold of three sensor data points for a search window) or may be dynamic based on one or more conditions associated with the vehicle and/or the vehicle trajectory. At operation 908, if the sensor data points 932 included in the search window 924 meet or exceed the threshold number of points, the process 900 may proceed to operation 910. At operation 908, if the sensor data points are less than the threshold number of points, the process 900 may proceed to operation 712. In some examples, if there are no sensor data points included in the search window 924, the search window 924 may be expanded by expanding the upper bound slope 926 and/or the lower bound slope 928. For example, if the upper bound slope 926 and/or lower bound slope 928 are associated with a ground role change of two degrees per meter, and there are no sensor data points in the search window 924, the upper bound slope 926 and/or lower bound slope 928 may each be expanded by an additional two degrees per meter.

At operation 910, the example process 900 may comprise determining, based on the first subset of sensor data points, a representative height and representative roll associated with the region, such as search window 924. Operation 910 may additionally or alternatively comprise an algorithm. As described in more detail below with respect to FIG. 10, the algorithm may be configured to transform (e.g., convert) slopes and heights, elevations, and/or positions associated with the sensor data points 932 that are included in the search window 924 in order to determine a ground profile 938. In some instances, the algorithm may comprise a Hough transform configured to define a representative roll and/or representative height associated with search window (e.g., based on a peak between representations, such as a line, of each of the sensor data points of the sensor data points 932). For example, based on transformed slopes and heights associated with each of the sensor data points 932, the algorithm may be configured to determine a representative height and representative roll associated with the search window 924, which may be represented by position 934. In other words, based on the transformed slopes and heights associated with each of the sensor data points 932, the algorithm may determine the height and roll of the ground.

Figure 10:
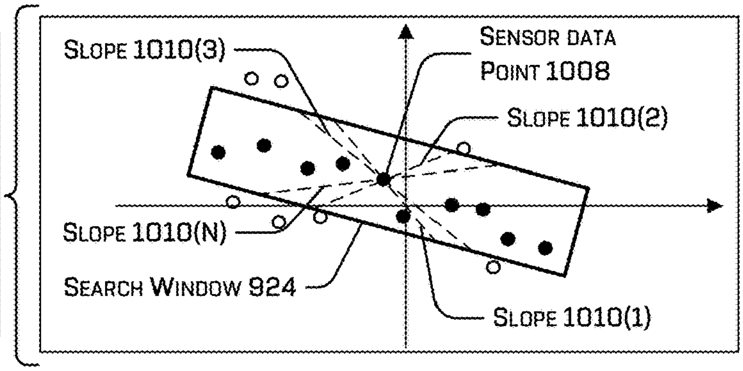
FIG. 10 illustrates a pictorial flow diagram of an example process for determining a height and roll for a ground profile.
Figure 10:
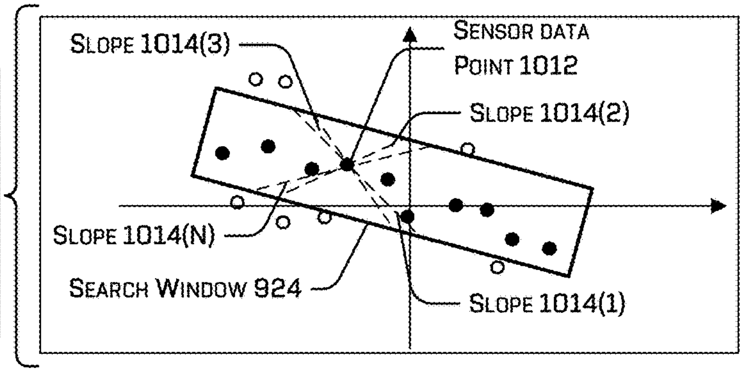
Figure 10:
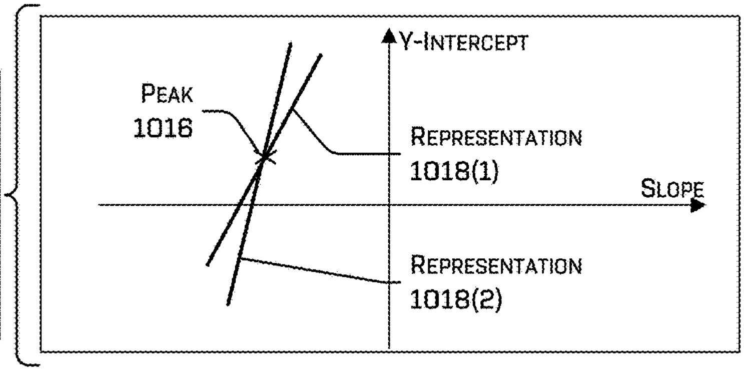
Figure 11:
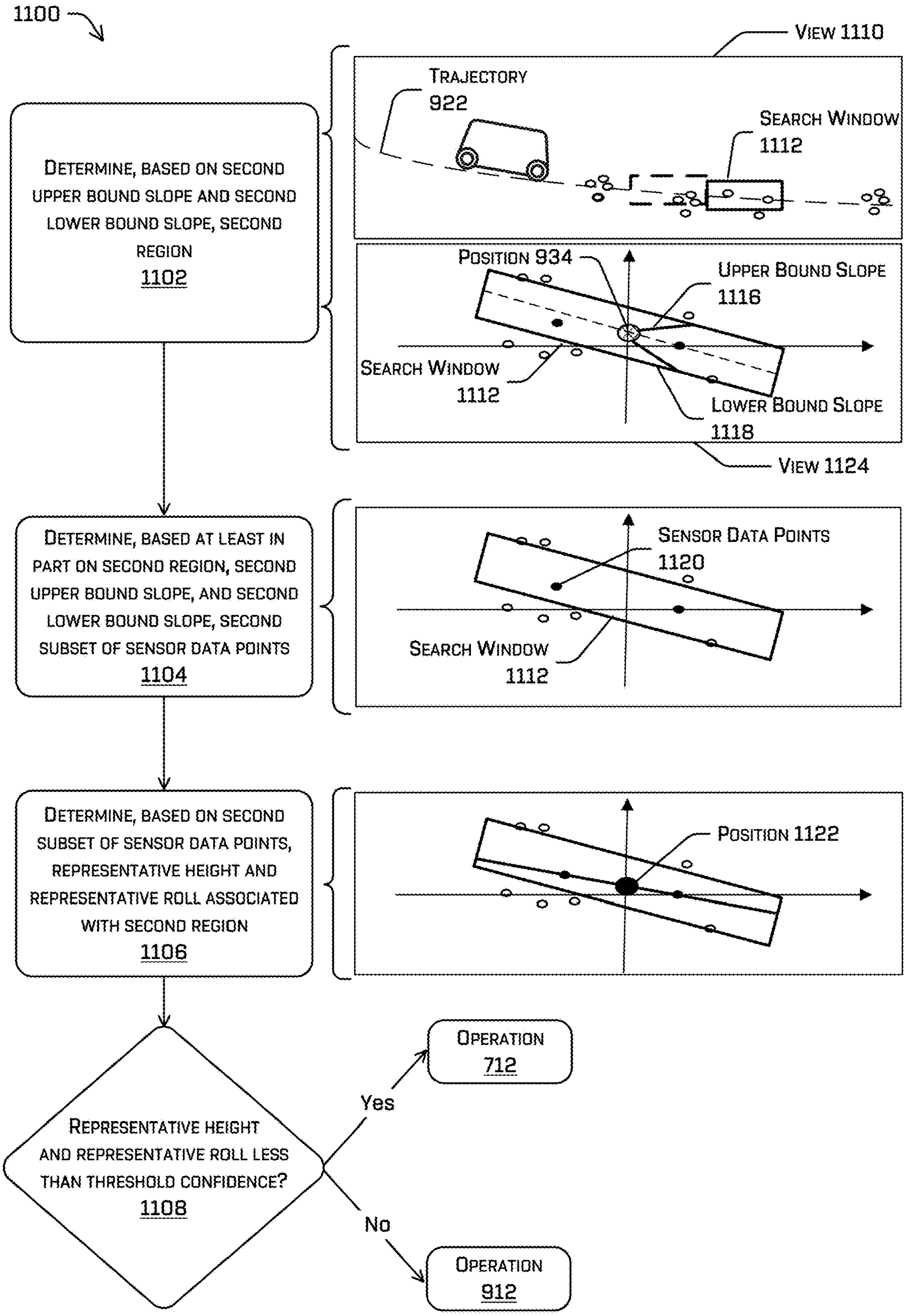
FIG. 11 illustrates a pictorial flow diagram of a continuation of the example process for determining a multi-dimensional ground profile.

While the use of a line is described with respect to representations of slopes, sensor data points, positions, etc., in FIGS. 9-11 it should be appreciated that curve fitting may similarly be used instead of, or in addition to, line fitting. Additionally, or alternatively, in some instances, based on the representative height and representative roll associated with the search window 924 (e.g., the position 934), the longitudinal view of the search window 924 as depicted in view 920 may similarly be adjusted to account for the position 934 (e.g., the top of the search window 924 may be adjusted to account for the determined roll).

At operation 912, the process 900 may comprise determining a ground profile based at least in part on the representative height and representative roll. The ground profile 938 may identify an estimate of a topography of the ground along the trajectory 922, both in terms of pitch (e.g., elevation) of the ground and the roll of the ground, according to any of the techniques described herein. Additionally, or alternatively, the ground profile 938 may be used to determine excluded sensor data points 940 based on the excluded sensor data points 940 being outside a threshold distance from the ground profile 938. Based on the excluded sensor data points 940 being outside a threshold distance from the ground profile 938, the excluded sensor data points 940 may not be included as part of the ground profile, and thus may be included as perception data and may be used for object detections. For example, the excluded sensor data points 940 may be included as perception data and may be used to detect an object, such as a pedestrian, obstruction, vehicle, and/or the like. Based on the detected object, the vehicle maybe controlled accordingly. While illustrated below the ground profile 938 (e.g., in instances where road conditions may cause a reflection and lidar return from below the ground profile 938), the excluded sensor data points 940 may also be above the ground profile 938.

FIG. 10 illustrates a pictorial flow diagram of an example process for determining a height and roll for a ground profile. As described above with respect to FIG. 9, based on a first subset of sensor data points, a representative height and representative roll may be determined. As part of this, the example process 1000 may include an algorithm, such as a Hough transform, that may be configured to determine and/or identify lines, or slopes, associated with one or more sensor data points included in a region, and transform (e.g., convert) such lines to a representation, such as a parameter space.

As part of this, at operation 1002, the example process 1000 may comprise determining a plurality of first slopes associated with a first sensor data point of the subset of sensor data points. For example, the sensor data points of search window 924 may include sensor data point 1008. As illustrated, the sensor data point may include, or be discretized by, one or more slopes (i.e., candidate slopes) such as slope 1010(1), 1010(2), 1010(3), and 1010(N) (where "N" is any integer greater than one). The slopes 1010 may be represented by a line, and the slopes 1010 may be determined based on any line that may pass through the sensor data point 1008 and contained within the search window 924. Additionally, or alternatively, the slopes 1010 may be determined based on particular increments within the search window 924. In some instances, a slope may be determined every degree, half of a degree, etc. within the search window 924.

By way of example, and not limitation, in instances where the search window 924 is constrained by an upper and lower bound slope of two degrees, and a line and associated slope is determined for every half of a degree, the sensor data point 1008 may be associated with nine lines, and in turn, nine slopes. Additionally, or alternatively, based on the slopes 1010 and/or the position of the sensor data point 1008, each slope 1010 may be associated with a particular height (i.e., candidate height), or point at which the representative line for each slope 1010 passes through the y-intercept in the graphical representation of the vehicle environment. For example, each slope 1010 may be represented by a line, wherein the line may include a slope intercept form such that the y-intercept may be determined. The y-intercept may indicate a distance from a trajectory, such as trajectory 922, with the origin being associated with a position, such as position 916 (e.g., the pose of the vehicle or the previous position of a previous search window). Accordingly, for each of the slopes 1010 associated with the sensor data point 1008, there may be a particular height (e.g., the y-intercept, or distance from the trajectory).

At operation 1004, the process example process 1000 may comprise determining a plurality of second slopes associated with a second sensor data point of the subset of sensor data points. For example, the sensor data points of search window 924 may include sensor data point 1012. As illustrated, the sensor data point may include, or be discretized by, one or more slopes, such as slope 1014(1), 1014(2), 1014(3), and 1014(N) (where "N" is any integer greater than one). The slopes 1014 may be represented by a line, and the slopes 1014 may be determined based on any line that may pass through the sensor data point 1012 and within the search window 924. Additionally, or alternatively, the slopes 1014 may be determined based on particular increments within the search window 924. In some instances, a slope may be determined every degree, half of a degree, etc. within the search window 924. Additionally, or alternatively, based on the slopes 1014 and/or the position of the sensor data point 1012, each slope 1014 may be associated with a particular height (i.e., candidate height), or point at which the representative line for each slope 1014 passes through the y-intercept in the graphical representation of the vehicle environment. For example, each slope 1014 may be represented by a line, wherein the line may include a slope intercept form such that the y-intercept may be determined. Accordingly, for each of the slopes 1014 associated with the sensor data point 1012, there may be a particular height (e.g., the y-intercept). While FIG. 10 illustrates slopes 1010 associated with sensor data point 1008 and slopes 1014 associated with sensor data point 1012, slopes may similarly be determined for reach of the sensor data points included in the search window 924.

At operation 1006, the example process 1000 may further comprise wherein determining the representative height and the representative roll is further based on the plurality of first slopes and the plurality of second slopes. As described above, each of the sensor data points of the subset of sensor data points included in a constrained region, such as search window 924, may be associated with one or more slopes (e.g., candidate rolls) and one or more y-intercepts (e.g., candidate heights). For example, sensor data point 1008 may include slopes 1010(1), 1010(2), 1010(3), and/or 1010(N), as well as related y-intercepts in the graphical representation of the vehicle environment. Further, sensor data point 1012 may include slopes 1014(1), 1014(2), 1014(3), and/or 1014 (N), as well as related y-intercepts in the graphical representation of the vehicle environment. Based on the slopes and y-intercepts related to each of the sensor data points, a representation may be generated for each of the sensor data points. For example, sensor data point 1008 may be associated with representation 1018(1), wherein the representation 1018(1) is a linear representation of each of the slopes 1010 and their related y-intercepts. Additionally, or alternatively, sensor data point 1012 may be associated with representation 1018(2), wherein the representation 1018(2) is a linear representation of each of the slopes 1014 and their related y-intercepts.

Additionally, or alternatively, representation 1018(1) and/or 1018(2) may be used to determine a peak 1016. As illustrated, peak 1016 may include an intersection between the representation 1018(1) and 1018(2), and may indicate an accumulation of more than one value, or slopes, associated with a y-intercept. In some instances, representation 1018(1) and representation 1018(2) may be associated with an accumulator array. The accumulator array may be configured to determine a peak 1016 using each y-intercept and/or slope detected within the search window 924 and associated with sensor data points 1008 and 1012. For example, using the accumulator array, a quantity (i.e., count) of slopes may be iteratively determined for each of the y-intercepts identified in the search window 924, or vice versa. The quantity of slopes may be determined based on linear representations, such as representation 1018(1) and/or representation 1018 (2), traversing an accumulator cell and/or otherwise intersecting. For example, based on a plurality of intersections (i.e., traversals) associated with linear representations (e.g., representation 1018(1), 1018(2), and/or the like), a distribution of the intersections may be identified. The distribution of intersections may be represented by the accumulator array, and may indicate the distribution of intersections with respect to each coordinate, such as coordinates each representing a y-intercept and slope. Based on the distribution of intersections, each coordinate, or accumulator cell, may be associated with a value indicating the quantity of intersections associated with that accumulator cell. Additionally, or alternatively, other accumulator cells that are adjacent to the accumulator cell through which the representation 1018(1) and/or representation 1018(2) traverses may be similarly indicated as having such a traversal and/or intersection. Accordingly, the peak 1016 may be determined based on the distribution of intersections and the accumulator cell with the maximum quantity of traversals and/or a determined maximum value in the accumulator array (e.g., where representation 1018(1) and representation 1018(2) intersect). Additionally, or alternatively, based on the peak 1016, the representative roll and representative height of the search window 924 may be determined using the coordinates of the slope and y-intercept associated with the peak 1016. For example, the coordinates of the slope and the y-intercept associated with the peak 1016 may indicate the representative roll of the search window 924 and the representative height at the middle of the search window 924. In some instances, the value associated with the coordinates of the slope and y-intercept may be a direct mapping to the value associated with the representative roll and representative height of the search window 924. A position associated with the search window 924 may encompass the representative roll and representative height of the search window 924, such as position 934 illustrated in FIG. 9.

FIG. 11 illustrates a pictorial flow diagram of a continuation of the example process 900 for determining a multi-dimensional ground profile.

At operation 1102, the example process 1100 may comprise determining, based on a second upper bound slope and a second lower bound slope, a second region. By way of example, and not limitation, the upper bound slope 1116 and/or lower bound slope 1118 may be used to define the parameters of a region, such as search window 1112. Additionally, or alternatively, while view 1110 depicts search window 1112 longitudinally along the length of the trajectory 922, the upper bound slope 1116 and/or lower bound slope 1118 may be used to define the search window 1112 laterally, or as a cross-section, along the length of the trajectory 922, as depicted at view 1124 with a graphical representation (i.e., with axes).

The upper bound slope 1116 and/or lower bound slope 1118 may be determined based on a rate of ground roll change. For example, the search window 1112 may be limited, or constrained by a maximum ground roll change, as it may be unlikely for the ground to change in roll quickly and drastically. The rate of ground roll change may be a pre-determined static number, value, or metric stored in memory associated with a rate of ground roll change (e.g., two degrees per meter). Additionally, or alternatively, the upper bound slope 1116 and/or the lower bound slope 1118 may include an absolute value of the rate of ground roll change. As illustrated in the example process 1100, where the vehicle is traveling along the trajectory 922 and the view 1124 depicts the lateral view of the search window 924, the parameters of the search window 1112 may be determined based on the upper bound slope 1116 and lower bound slope 1118, which may constrain the search window 1112 to the maximum ground roll change, such as two degrees per meter, in both the negative and/or positive direction.

Additionally, or alternatively, the upper bound slope 1116 and/or lower bound slope 1118 may be determined based on the position 934. As described in more detail above with respect to position 916 of FIG. 9, the position 934 may similarly be associated with a previously-determined position of a previous search window, such as search window 924 of FIG. 9 and/or FIG. 10, and representative of a particular portion of the trajectory 922. For example, the position 934 may indicate the height and roll representative of the previously-determined search window 924. As illustrated, the upper bound slope 1116 may define the top of the search window 1112, and the lower bound slope 1118 may define the bottom portion of the search window 924. In some examples, while the upper bound slope 1116 and/or lower bound slope 1118 may be used to determine the parameters of the search window 1112, where the search window 1112 is defined by a width that extends laterally relative to the trajectory 922, the search window 1112 may be further defined based on the size of the vehicle (e.g., vehicle width) and/or a lateral threshold distance along the distance of the trajectory 922. For example, lateral width of the search window 1112 may expand to be commensurate with the width of the vehicle, a corridor, and/or some buffer.

At operation 1104, the example process 1100 may further comprise determining, based at least in part on the second region, the second upper bound slope, and the second lower bound slope, a second subset of sensor data points. As illustrated, the search window 1112 may include a subset of sensor data points, such as sensor data points 1120, that fall within the search window 1112. Sensor data points 1120 may be associated with a lidar sensor return indicating a surface, object, etc.

At operation 1106, the example process 1100 may comprise determining, based on the second subset of sensor data points, a representative height and representative roll associated with the second region. Operation 1106 may additionally or alternatively comprise an algorithm, such as the algorithm described in FIG. 10, where the algorithm may be configured to transform (e.g., convert) slopes and heights, elevations, and/or positions associated with the sensor data points 1120 that are included in the search window 1112. For example, based on transformed slopes and heights associated with each of the sensor data points 1120, the algorithm may be configured to determine a representative height and representative roll associated with the search window 1112. In other words, based on the transformed slopes and heights associated with each of the sensor data points 1120, the algorithm may determine the height and roll of the ground, where the representative height and roll are determined by identifying the peak associated with the transformed slopes and heights. Additionally, or alternatively, the representative height and representative roll may be encompassed by position 1122.

Operation 1108 of example process 1100 may further include determining whether the representative height and representative roll is less than a threshold confidence. For example, in some instances, the position 1122 including the representative height and representative roll associated with the search window 1112 may be determined to be below a threshold confidence level. For example, it may be determined that the number of linear representations of each of the sensor data points 1120, such as those described above with respect to FIG. 10, is below a threshold confidence percentage (e.g., despite the linear representations indicating a peak, less than 40% of the total linear representations traverse the accumulator cell associated with the peak). In instances where the position 1122 is below the threshold confidence percentage, the process 1100 may proceed, or revert to, operation 712. Additionally, or alternatively, in instances where the position 1122 is below the threshold confidence percentage, the roll of a previously-determined position, such as position 934, may be propagated along the length of the trajectory. In some instances, the previously-determined roll may be propagated along the length of the trajectory and may be associated with and/or adjusted by a rate of decay. In instances where the position 1122 meets and/or exceeds the threshold confidence percentage, the process 1100 may proceed to operation 912. Additionally, or alternatively, in some instances, the position 1122 may be below the threshold confidence percentage (e.g., less than 40% of the total linear representations associated with each of the sensor data points 1120 traverse the accumulator cell associated with the peak represented by the position 1122). However, in such instances, it may be determined that the search window 1112 is within a threshold distance from the vehicle (e.g., at or within eight meters from the vehicle), where the operation may proceed to operation 912 and use the peak associated with the search window 1112 to determine the representative height and representative roll.

Example Clauses

A: A method comprising: receiving sensor data from a sensor associated with an autonomous vehicle; receiving a set of waypoints from a first system of the autonomous vehicle through which the autonomous vehicle is to travel; determining, by a second system of the autonomous vehicle and based at least in part on a first subset of the sensor data associated with the set of waypoints, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a second subset of the sensor data based at least in part on excluding the sensor data point from the first subset of the sensor data; determining, by the second system and based at least in part on the second subset of the sensor data, a second ground profile; and determining, by the second system and based at least in part on the second ground profile, a validity of the set of waypoints.

B: The method of paragraph A, wherein: determining the validity of the set of waypoints comprises detecting an object based at least in part on the second ground profile; and the method further comprises controlling the autonomous vehicle based at least in part on the detected object.

C: The method of either paragraph A or B, wherein determining the line further comprises: determining, based at least in part on the maximum slope, a preliminary line having the maximum slope associated with the first location; and shifting the preliminary line vertically to define the line.

D: The method of any one of paragraphs A-C, wherein: determining the line further comprises determining a first line and a second line; and the first line is positively sloped and the second line is negative sloped.

E: The method of any one of paragraphs A-D, wherein excluding the sensor data point comprises downweighting or masking the sensor data point for generating the second ground profile.

F: A system comprising: one or more processors; and a memory storing processor-executable instructions that, when executed by the one or more processors, cause the system to perform operations comprising: receiving sensor data from a sensor associated with an vehicle; determining, based at least in part on a the sensor data, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a subset of the sensor data based at least in part on excluding the sensor data point from the first subset of the sensor data; determining, based at least in part on the subset of the sensor data, a second ground profile; and determining, based at least in part on the second ground profile, a validity of the set of waypoints.

G: The system of paragraph F, wherein: the operations further comprise receiving a set of waypoints from a first system of the vehicle; a second system determines the first ground profile and the second ground profile based at least in part on the set of waypoints; and the second system determines the validity of the set of waypoints.

H: The system of either paragraph F or G, wherein: determining the validity of the set of waypoints comprises detecting an object based at least in part on the second ground profile; and the method further comprises controlling the autonomous vehicle based at least in part on the detected object.

I: The system of any one of paragraphs F-H, further comprising: detecting an object based at least in part on the second ground profile; and controlling the vehicle based at least in part on the detected object.

J: The system of any one of paragraphs F-I, wherein determining the line further comprises: determining, based at least in part on the maximum slope, a preliminary line having the maximum slope associated with the first location; and shifting the preliminary line vertically to define the line.

K: The system of any one of paragraphs F-J, wherein: determining the line further comprises determining a first line and a second line; and the first line is positively sloped and the second line is negative sloped.

L: The system of any one of paragraphs F-K, wherein excluding the sensor data point comprises downweighting or masking the sensor data point for generating the second ground profile.

M: The system of any one of paragraphs F-L, wherein the subset of sensor data points is a first subset of data points and wherein the operations further comprise determining a corridor associated with the set of waypoints, wherein the first ground profile and the second ground profile are further based at least in part on a second subset of sensor data points within a width of the set of waypoints.

N: The system of any one of paragraphs F-M, wherein determining the first ground profile further comprises one of: determining a previous path associated with a previous operation of the autonomous vehicle, determining a position of an axle of the autonomous vehicle, or determining a nearest location to the autonomous vehicle along the path that is associated with a slope that is less than or equal to a maximum slope.

O: A non-transitory computer-readable medium storing processor-executable instructions that, when executed by one or more processors, cause the one or more processors to perform operations comprising: receiving sensor data from a sensor associated with an vehicle; determining, based at least in part on a the sensor data, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a subset of the sensor data based at least in part on excluding the sensor data point from the first subset of the sensor data; determining, based at least in part on the subset of the sensor data, a second ground profile; and determining, based at least in part on the second ground profile, a validity of the set of waypoints.

P: The non-transitory computer-readable medium of paragraph O, wherein: the operations further comprise receiving a set of waypoints from a first system of the vehicle; a second system determines the first ground profile and the second ground profile based at least in part on the set of waypoints; and the second system determines the validity of the set of waypoints.

Q: The non-transitory computer-readable medium of either paragraph O or P, wherein: determining the validity of the set of waypoints comprises detecting an object based at least in part on the second ground profile; and the method further comprises controlling the autonomous vehicle based at least in part on the detected object.

R: The non-transitory computer-readable medium of any one of paragraphs O-Q, further comprising: detecting an object based at least in part on the second ground profile; and controlling the vehicle based at least in part on the detected object.

S: The non-transitory computer-readable medium of any one of paragraphs O-R, wherein: determining the line further comprises determining a first line and a second line; and the first line is positively sloped and the second line is negative sloped.

T: The non-transitory computer-readable medium of any one of paragraphs O-S, wherein determining the first ground profile further comprises one of: determining a previous path associated with a previous operation of the autonomous vehicle, determining a position of an axle of the autonomous vehicle, or determining a nearest location to the autonomous vehicle along the path that is associated with a slope that is less than or equal to a maximum slope.

U: A system comprising: one or more processors; and one or more non-transitory computer-readable media storing computer executable instructions that, when executed, cause the one or more processors to perform operations comprising: receiving a path associated with controlling an autonomous vehicle through an environment; receiving lidar data from a sensor associated with the autonomous vehicle; associating the lidar data with a bin associated with a distance along the path; determining, based at least in part on a first metric, a lower bound height associated with the bin; determining, based at least in part on a second metric, an upper bound height associated with the bin; determining, as a subset of data, a portion of the lidar data associated with the bin that falls within the lower bound height and the upper bound height; determining, based on the subset of data, a representative height associated with the bin; determining, based at least in part on the representative height, a ground surface based on the subset of data; and controlling the autonomous vehicle based on the ground surface.

V: The system of paragraph U, wherein determining one or more of the lower bound height or the upper bound height is based at least in part on a position associated with the autonomous vehicle or a previous representative height associated with a previous bin associated with the distance along the path.

W: The system of either paragraph U or V, the operations further comprising: determining a distance between a first point and the path; determining a weight based on the distance; and determining the representative height associated with the bin based at least in part on the weight.

X: The system of any one of paragraphs U-W, wherein the lower bound height is a first lower bound height, and the upper bound height is a first upper bound height, the operations further comprising: determining a second lower bound height and second upper bound height of a second bin; determining that a number of lidar points associated with the second bin is less than a threshold number of points; determining a third upper bound height and a third lower bound height of a third bin based on the second lower bound height and the first metric and the second upper bound height and the second metric; and determining, as a second subset of data, a portion of the lidar data associated with the third bin and that falls within the third lower bound height and the third upper bound height.

Y: The system of any one of paragraphs U-X, the operations further comprising: detecting an object based on the ground surface; and controlling the autonomous vehicle based on the object.

Z: One or more non-transitory computer-readable media storing instructions executable by one or more processors that, when executed, cause the one or more processors to perform operations comprising: receiving sensor data from a sensor associated with a vehicle; determining, based on the sensor data, sensor data points associated with a path of the vehicle; determining, based on a first metric and a second metric, a first region; determining, based at least in part on the first region, a first subset of the sensor data points; determining, based on the first subset of the sensor data points, a first ground point; and determining a ground profile based at least in part on the first ground point.

AA: The one or more non-transitory computer-readable media of paragraph Z, the operations further comprising: determining, based on a third metric and a fourth metric, a second region, wherein the second region includes a second subset of the sensor data points; and determining, based on the second subset of the sensor data points, a second ground point, wherein determining the ground profile is further based at least in part the second ground point.

AB: The one or more non-transitory computer-readable media of either paragraph Z or AA, the operations further comprising: excluding the sensor data points associated with the path of the vehicle; identifying, based at least in part on the sensor data and the ground profile, a second subset of sensor data points; detecting, based at least in part on the second subset of sensor data points, an object; and controlling the vehicle based on the object.

AC: The one or more non-transitory computer-readable media of any one of paragraphs Z-AB, wherein the first metric comprises a first maximum slope and the second metric comprises a first minimum slope.

AD: The one or more non-transitory computer-readable media of any one of paragraphs Z-AC, the operations further comprising: determining a distance between a first sensor data point and the path; and determining a weight based on the distance, wherein determining the first ground point is based at least in part on the weight.

AE: The one or more non-transitory computer-readable media of any one of paragraphs Z-AD, the operations further comprising: determining, based on a third metric and a fourth metric, a second region; determining that a second subset of sensor data points associated with the second region is less than a threshold number of points; determining a fifth metric and a sixth associated with a third region based on the third metric and the fourth metric; and determining, based on a third subset of the sensor data points included in the third region, a second ground point, wherein determining the ground profile is further based at least in part on the second ground point.

AF: The one or more non-transitory computer-readable media of any one of paragraphs Z-AE, wherein the sensor data points are within a threshold lateral distance of the path and within a threshold distance of the vehicle along the path.

AG: The one or more non-transitory computer-readable media of paragraph AA, wherein the first region is laterally adjacent to the second region, the operations further comprising: determining a roll constraint based on the first region and the second region; and determining, based on the roll constraint, the first ground point of the first region and the second ground point of the second region.

AH: A method comprising: receiving sensor data from a sensor associated with a vehicle; determining, based on the sensor data, sensor data points associated with a path of the vehicle; determining, based on a first metric and a second metric, a first region; determining, based at least in part on the first region, a first subset of the sensor data points; determining, based on the first subset of the sensor data points, a first ground point; and determining a ground profile based at least in part on the first ground point.

AI: The method of paragraph AH, further comprising: determining, based on a third metric and a fourth metric, a second region, wherein the second region includes a second subset of the sensor data points; and determining, based on the second subset of the sensor data points, a second ground point, wherein determining the ground profile is further based at least in part the second ground point.

AJ: The method of either paragraph AH or AI, further comprising: excluding the sensor data points associated with the path of the vehicle; identifying, based at least in part on the sensor data and the ground profile, a second subset of sensor data points; detecting, based at least in part on the second subset of sensor data points, an object; and controlling the vehicle based on the object.

AK: The method of any one of paragraphs AH-AJ, wherein the first metric comprises a first maximum slope and the second metric comprises a first minimum slope.

AL: The method of any one of paragraphs AH-AK, further comprising: determining a distance between a first sensor data point and the path; and determining a weight based on the distance, wherein determining the first ground point is based at least in part on the weight.

AM: The method of any one of paragraphs AH-AL, further comprising: determining, based on a third metric and a fourth metric, a second region; determining that a second subset of sensor data points associated with the second region is less than a threshold number of points; determining a fifth metric and a sixth associated with a third region based on the third metric and the fourth metric; and determining, based on a third subset of the sensor data points included in the third region, a second ground point, wherein determining the ground profile is further based at least in part on the second ground point.

AN: The method of paragraph AI, wherein the first region is laterally adjacent to the second region, the method further comprising: determining a roll constraint based on the first region and the second region; and determining, based on the roll constraint, the first ground point of the first region and the second ground point of the second region.

AO: A system comprising: one or more processors; and one or more non-transitory computer-readable media storing computer executable instructions that, when executed, cause the one or more processors to perform operations comprising: receiving a path associated with controlling an autonomous vehicle through an environment; receiving lidar data from a sensor associated with the autonomous vehicle; associating the lidar data with a bin at a distance along the path; determining a lower bound slope and an upper bound slope associated with the bin; identifying, as a subset of data, a portion of the lidar data associated with the bin that falls within the lower bound slope and the upper bound slope; determining, based on the subset of data, candidate heights associated with the bin; determining, based on the subset of data, candidate rolls associated with the bin; determining a representative height from the candidate heights and a representative roll from the candidate rolls; determining, based at least in part on the representative height and the representative roll, a ground surface; and controlling the autonomous vehicle based on the ground surface.

AP: The system of paragraph AO, wherein determining the upper bound slope and the lower bound slope comprises determining one or more of a position associated with the autonomous vehicle or a previous representative height and previous representative roll of a previous bin associated with the distance along the path.

AQ: The system of either paragraph AO or AP, wherein the bin is a first bin, the lower bound slope is a first lower bound slope, the upper bound slope is a first upper bound slope, the subset of data is a first subset, and the operations further comprising: determining a second lower bound slope and a second upper bound slope associated with a second bin; determining that a second subset of data that falls within the second lower bound slope and the second upper bound slope of the second bin is less than a threshold number of data; determining a lower bound height and upper bound height of the second bin; identifying, as a second subset of data, a portion of the lidar data associated with the second bin that falls within the lower bound height and the upper bound height; and determining, based on the second subset of data, a representative height associated with the second bin, wherein determining the ground surface is further based on the representative height associated with the second bin.

AR: The system of any one of paragraphs AO-AQ, wherein determining the representative height and the representative roll comprises: applying one or more transformations to the candidate heights and candidate rolls to generate linear representations associated with each of the subset of data; identifying a plurality of intersections associated with the linear representations; determining, based on the plurality of intersections, a distribution of intersections; and identifying, based on the distribution of intersections, a peak from the plurality of intersections, wherein the representative height and representative roll is based at least in part on the peak.

AS: The system of any one of paragraphs AO-AR, the operations further comprising: detecting an object based on the ground surface; and controlling the autonomous vehicle based on the object.

AT: One or more non-transitory computer-readable media storing instructions executable by one or more processors that, when executed, cause the one or more processors to perform operations comprising: receiving sensor data from a sensor associated with a vehicle; determining, based on the sensor data, sensor data points associated with a path of the vehicle; determining, based on a first upper bound slope and a first lower bound slope, a first region; determining, based at least in part on the first region, the first lower bound slope, and the first upper bound slope, a first subset of the sensor data points; determining, based on the first subset of the sensor data points, a representative height and representative roll; and determining a ground profile based at least in part on the representative height and the representative roll.

AU: The one or more non-transitory computer-readable media of paragraph AT, wherein the first upper bound slope and the first lower bound slope are based at least in part on a first metric, the operations further comprising: determining a second upper bound slope and a second lower bound slope; determining, based on the second upper bound slope and the second lower bound slope, a second region; determining, based at least in part on the second region, the second lower bound slope, and the second upper bound slope, a second subset of sensor data points; and determining, based on the second subset of sensor data points, a representative height and representative roll associated with the second region, wherein determining the ground profile is further based on the representative height and representative roll associated with the second region.

AV: The one or more non-transitory computer-readable media of paragraph AU, wherein determining the first upper bound slope and the first lower bound slope comprises determining a position associated with the vehicle, and determining the second upper bound slope and the second lower bound slope comprises determining a previous representative height and previous representative roll of a previous region.

AW: The one or more non-transitory computer-readable media of any one of paragraphs AT-AV, the operations further comprising: excluding the sensor data points associated with the ground profile of the vehicle; identifying, based at least in part on the sensor data and the ground profile, a second subset of sensor data points; detecting, based at least in part on the second subset of sensor data points, an object; and controlling the vehicle based on the object.

AX: The one or more non-transitory computer-readable media of any one of paragraphs AT-AW, the operations further comprising: determining, based on a second upper bound slope and second lower bound slope, a second region; determining, based at least in part on the second region, the second upper bound slope, and the second lower bound slope, a second subset of sensor data points; determining that the second subset of sensor data points associated with the second region is less than a threshold number of points; determining, based on an upper bound height and a lower bound height, a third region; determining, based at least in part on the third region, the upper bound height, and the lower bound height, a third subset of the sensor data points; and determining, based on the third subset of the sensor data points, a ground point, wherein determining the ground profile is further based on the ground point.

AY: The one or more non-transitory computer-readable media of any one of paragraphs AT-AX, the operations further comprising: determining, based on a second upper bound slope and second lower bound slope, a second region; determining, based at least in part on the second region, the second upper bound slope, and the second lower bound slope, a second subset of sensor data points; determining, based on the second subset of sensor data points, a representative height and representative roll associated with the second region; determining that the representative height and representative roll associated with the second region are less than a threshold confidence of roll and height; determining, based on an upper bound height and a lower bound height, a third region; determining, based at least in part on the third region, the upper bound height, and the lower bound height, a third subset of the sensor data points; and determining, based on the third subset of the sensor data points, a ground point, wherein determining the ground profile is further based on the ground point.

AZ: The one or more non-transitory computer-readable media of any one of paragraphs AT-AY, wherein determining the representative height and the representative roll associated with the first region further comprises: determining a plurality of first slopes associated with a first sensor data point of the first subset; and determining a plurality of second slopes associated with a second sensor data point of the first subset, wherein determining the representative height and the representative roll is further based on the plurality of first slopes and the plurality of second slopes.

BA: The one or more non-transitory computer-readable media of any one of paragraphs AT-AZ, wherein the first region is defined by a width that extends laterally relative to the path of the vehicle.

BB: A method comprising: receiving sensor data from a sensor associated with a vehicle; determining, based on the sensor data, sensor data points associated with a path of the vehicle; determining, based on a first upper bound slope and a first lower bound slope, a first region; determining, based at least in part on the first region, the first lower bound slope, and the first upper bound slope, a first subset of the sensor data points; determining, based on the first subset of the sensor data points, a representative height and representative roll; and determining a ground profile based at least in part on the representative height and the representative roll.

BC: The method of paragraph BB, wherein the first upper bound slope and the first lower bound slope are based at least in part on a first metric, the method further comprising: determining a second upper bound slope and a second lower bound slope; determining, based on the second upper bound slope and the second lower bound slope, a second region; determining, based at least in part on the second region, the second lower bound slope, and the second upper bound slope, a second subset of sensor data points; and determining, based on the second subset of sensor data points, a representative height and representative roll associated with the second region, wherein determining the ground profile is further based on the representative height and representative roll associated with the second region.

BD: The method of paragraph BC, wherein determining the first upper bound slope and the first lower bound slope comprises determining a position associated with the vehicle, and determining the second upper bound slope and the second lower bound slope comprises determining a previous representative height and previous representative roll of a previous region.

BE: The method of any one of paragraphs BB-BD, further comprising: excluding the sensor data points associated with the ground profile of the vehicle; identifying, based at least in part on the sensor data and the ground profile, a second subset of sensor data points; detecting, based at least in part on the second subset of sensor data points, an object; and controlling the vehicle based on the object.

BF: The method of any one of paragraphs BB-BE, further comprising: determining, based on a second upper bound slope and second lower bound slope, a second region; determining, based at least in part on the second region, the second upper bound slope, and the second lower bound slope, a second subset of sensor data points; determining that the second subset of sensor data points associated with the second region is less than a threshold number of points; determining, based on an upper bound height and a lower bound height, a third region; determining, based at least in part on the third region, the upper bound height, and the lower bound height, a third subset of the sensor data points; and determining, based on the third subset of the sensor data points, a ground point, wherein determining the ground profile is further based on the ground point.

BG: The method of any one of paragraphs BB-BF, further comprising: determining, based on a second upper bound slope and second lower bound slope, a second region; determining, based at least in part on the second region, the second upper bound slope, and the second lower bound slope, a second subset of sensor data points; determining, based on the second subset of sensor data points, a representative height and representative roll associated with the second region; determining that the representative height and representative roll associated with the second region are less than a threshold confidence of roll and height; determining, based on an upper bound height and a lower bound height, a third region; determining, based at least in part on the third region, the upper bound height, and the lower bound height, a third subset of the sensor data points; and determining, based on the third subset of the sensor data points, a ground point, wherein determining the ground profile is further based on the ground point.

BH: The method of any one of paragraphs BB-BG, wherein determining the representative height and the representative roll associated with the first region further comprises: determining a plurality of first slopes associated with a first sensor data point of the first subset; and determining a plurality of second slopes associated with a second sensor data point of the first subset, wherein determining the representative height and the representative roll is further based on the plurality of first slopes and the plurality of second slopes.

While the example clauses described above are described with respect to one particular implementation, it should be understood that, in the context of this document, the content of the example clauses can also be implemented via a method, device, system, computer-readable medium, and/or another implementation. Additionally, any of examples A-BH may be implemented alone or in combination with any other one or more of the examples A-BH.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer executable instructions that, when executed, cause the one or more processors to perform operations comprising:

receiving a path associated with controlling an autonomous vehicle through an environment;

receiving lidar data from a sensor associated with the autonomous vehicle;

associating the lidar data with a bin at a distance along the path;

determining a lower bound slope and an upper bound slope associated with the bin based on the lower bound slope and the upper bound slope indicating bounds of a rate of change associated with height values represented by the lidar data;

identifying, as a subset of data, a portion of the lidar data associated with the bin that falls within the lower bound slope and the upper bound slope;

determining, based on the subset of data, candidate heights associated with the bin;

determining, based on the subset of data, candidate rolls associated with the bin;

determining a representative height from the candidate heights and a representative roll from the candidate rolls;

determining, based at least in part on the representative height and the representative roll, a ground surface; and controlling the autonomous vehicle based on the ground surface.

2. The system of claim 1, wherein determining the upper bound slope and the lower bound slope comprises determining one or more of a position associated with the autonomous vehicle or a previous representative height and previous representative roll of a previous bin associated with the distance along the path.

3. The system of claim 1, wherein the bin is a first bin, the lower bound slope is a first lower bound slope, the upper bound slope is a first upper bound slope, the subset of data is a first subset, and the operations further comprising:

determining a second lower bound slope and a second upper bound slope associated with a second bin;

determining that a second subset of data that falls within the second lower bound slope and the second upper bound slope of the second bin is less than a threshold number of data;

determining a lower bound height and upper bound height of the second bin;

identifying, as a third subset of data, a portion of the lidar data associated with the second bin that falls within the lower bound height and the upper bound height; and determining, based on the third subset of data, a representative height associated with the second bin, wherein determining the ground surface is further based on the representative height associated with the second bin.

4. The system of claim 1, wherein determining the representative height and the representative roll comprises:

applying one or more transformations to the candidate heights and candidate rolls to generate linear representations associated with each of the subset of data;

identifying a plurality of intersections associated with the linear representations;

determining, based on the plurality of intersections, a distribution of intersections; and identifying, based on the distribution of intersections, a peak from the plurality of intersections, wherein the representative height and representative roll is based at least in part on the peak.

5. The system of claim 1, the operations further comprising:

detecting an object based on the ground surface; and controlling the autonomous vehicle based on the object.

6. One or more non-transitory computer-readable media storing instructions executable by one or more processors that, when executed, cause the one or more processors to perform operations comprising:

receiving sensor data from a sensor associated with a vehicle;

determining, based on the sensor data, sensor data points associated with a path of the vehicle;

determining, based on a first upper bound slope and a first lower bound slope indicating bounds of a rate of change associated with height values represented by the sensor data, a first region;

determining, based at least in part on the first region, the first lower bound slope, and the first upper bound slope, a first subset of the sensor data points;

determining, based on the first subset of the sensor data points, a representative height and representative roll;

determining a ground profile based at least in part on the representative height and the representative roll; and controlling the vehicle based on the ground profile.

7. The one or more non-transitory computer-readable media of claim 6, wherein the first upper bound slope and the first lower bound slope are based at least in part on a first metric, the operations further comprising:

determining a second upper bound slope and a second lower bound slope;

determining, based on the second upper bound slope and the second lower bound slope, a second region;

determining, based at least in part on the second region, the second lower bound slope, and the second upper bound slope, a second subset of sensor data points; and determining, based on the second subset of sensor data points, a representative height and representative roll associated with the second region, wherein determining the ground profile is further based on the representative height and representative roll associated with the second region.

8. The one or more non-transitory computer-readable media of claim 7, wherein determining the first upper bound slope and the first lower bound slope comprises determining a position associated with the vehicle, and determining the second upper bound slope and the second lower bound slope comprises determining a previous representative height and previous representative roll of a previous region.

9. The one or more non-transitory computer-readable media of claim 6, the operations further comprising:

excluding the sensor data points associated with the ground profile of the vehicle;

identifying, based at least in part on the sensor data and the ground profile, a second subset of sensor data points;

detecting, based at least in part on the second subset of sensor data points, an object; and controlling the vehicle based on the object.

10. The one or more non-transitory computer-readable media of claim 6, the operations further comprising:

determining, based on a second upper bound slope and second lower bound slope, a second region;

determining, based at least in part on the second region, the second upper bound slope, and the second lower bound slope, a second subset of sensor data points;

determining that the second subset of sensor data points associated with the second region is less than a threshold number of points;

determining, based on an upper bound height and a lower bound height, a third region;

determining, based at least in part on the third region, the upper bound height, and the lower bound height, a third subset of the sensor data points; and determining, based on the third subset of the sensor data points, a ground point, wherein determining the ground profile is further based on the ground point.

11. The one or more non-transitory computer-readable media of claim 6, the operations further comprising:

determining, based on a second upper bound slope and second lower bound slope, a second region;

determining, based at least in part on the second region, the second upper bound slope, and the second lower bound slope, a second subset of sensor data points;

determining, based on the second subset of sensor data points, a representative height and representative roll associated with the second region;

determining that the representative height and representative roll associated with the second region are less than a threshold confidence of roll and height;

determining, based on an upper bound height and a lower bound height, a third region;

determining, based at least in part on the third region, the upper bound height, and the lower bound height, a third subset of the sensor data points; and determining, based on the third subset of the sensor data points, a ground point, wherein determining the ground profile is further based on the ground point.

12. The one or more non-transitory computer-readable media of claim 6, wherein determining the representative height and the representative roll associated with the first region further comprises:

determining a plurality of first slopes associated with a first sensor data point of the first subset; and determining a plurality of second slopes associated with a second sensor data point of the first subset, wherein determining the representative height and the representative roll is further based on the plurality of first slopes and the plurality of second slopes.

13. The one or more non-transitory computer-readable media of claim 6, wherein the first region is defined by a width that extends laterally relative to the path of the vehicle.

14. A method comprising:

receiving sensor data from a sensor associated with a vehicle;

determining, based on the sensor data, sensor data points associated with a path of the vehicle;

determining, based on a first upper bound slope and a first lower bound slope indicating bounds of a rate of change associated with height values represented by the sensor data, a first region;

determining, based at least in part on the first region, the first lower bound slope, and the first upper bound slope, a first subset of the sensor data points;

determining, based on the first subset of the sensor data points, a representative height and representative roll;

determining a ground profile based at least in part on the representative height and the representative roll; and controlling the vehicle based on the ground profile.

15. The method of claim 14, wherein the first upper bound slope and the first lower bound slope are based at least in part on a first metric, the method further comprising:

determining a second upper bound slope and a second lower bound slope;

determining, based on the second upper bound slope and the second lower bound slope, a second region;

determining, based at least in part on the second region, the second lower bound slope, and the second upper bound slope, a second subset of sensor data points; and determining, based on the second subset of sensor data points, a representative height and representative roll associated with the second region, wherein determining the ground profile is further based on the representative height and representative roll associated with the second region.

16. The method of claim 15, wherein determining the first upper bound slope and the first lower bound slope comprises determining a position associated with the vehicle, and determining the second upper bound slope and the second lower bound slope comprises determining a previous representative height and previous representative roll of a previous region.

17. The method of claim 14, further comprising:

excluding the sensor data points associated with the ground profile of the vehicle;

identifying, based at least in part on the sensor data and the ground profile, a second subset of sensor data points;

detecting, based at least in part on the second subset of sensor data points, an object; and controlling the vehicle based on the object.

18. The method of claim 14, further comprising:

determining, based on a second upper bound slope and second lower bound slope, a second region;

determining, based at least in part on the second region, the second upper bound slope, and the second lower bound slope, a second subset of sensor data points;

determining that the second subset of sensor data points associated with the second region is less than a threshold number of points;

determining, based on an upper bound height and a lower bound height, a third region;

determining, based at least in part on the third region, the upper bound height, and the lower bound height, a third subset of the sensor data points; and determining, based on the third subset of the sensor data points, a ground point, wherein determining the ground profile is further based on the ground point.

19. The method of claim 14, further comprising:

determining, based on a second upper bound slope and second lower bound slope, a second region;

determining, based at least in part on the second region, the second upper bound slope, and the second lower bound slope, a second subset of sensor data points;

determining, based on the second subset of sensor data points, a representative height and representative roll associated with the second region;

determining that the representative height and representative roll associated with the second region are less than a threshold confidence of roll and height;

determining, based on an upper bound height and a lower bound height, a third region;

determining, based at least in part on the third region, the upper bound height, and the lower bound height, a third subset of the sensor data points; and determining, based on the third subset of the sensor data points, a ground point, wherein determining the ground profile is further based on the ground point.

20. The method of claim 14, wherein determining the representative height and the representative roll associated with the first region further comprises:

determining a plurality of first slopes associated with a first sensor data point of the first subset; and determining a plurality of second slopes associated with a second sensor data point of the first subset, wherein determining the representative height and the representative roll is further based on the plurality of first slopes and the plurality of second slopes.

* * * * *